US009604724B2

(12) United States Patent
Savard et al.

(10) Patent No.: US 9,604,724 B2
(45) Date of Patent: Mar. 28, 2017

(54) SEATING ARRANGEMENT CONVERTIBLE TO A BUNK BED

(71) Applicant: BOMBARDIER INC., Dorval, Québec (CA)

(72) Inventors: David Savard, Ste-Marthe-sur-le-lac (CA); Rene Bardier, Montreal (CA); Michael Oleson, Parkland, FL (US); Alfredo Suarez, Miramar, FL (US)

(73) Assignee: BOMBARDIER INC., Dorval, Quebec (CA)

( * ) Notice: Subject to any disclaimer, the term of this patent is extended or adjusted under 35 U.S.C. 154(b) by 0 days.

(21) Appl. No.: 14/398,365

(22) PCT Filed: May 3, 2013

(86) PCT No.: PCT/US2013/039476
§ 371 (c)(1),
(2) Date: Oct. 31, 2014

(87) PCT Pub. No.: WO2013/166390
PCT Pub. Date: Nov. 7, 2013

(65) Prior Publication Data
US 2015/0136904 A1 May 21, 2015

Related U.S. Application Data

(60) Provisional application No. 61/642,509, filed on May 4, 2012.

(51) Int. Cl.
*B64D 11/06* (2006.01)
*B60N 2/34* (2006.01)
(Continued)

(52) U.S. Cl.
CPC ............ *B64D 11/0641* (2014.12); *B60N 2/24* (2013.01); *B60N 2/34* (2013.01); *B60N 2/62* (2013.01);
(Continued)

(58) Field of Classification Search
CPC . B64D 11/06; B64D 11/0641; B64D 11/0604; B64D 11/0606; B64D 11/0648;
(Continued)

(56) References Cited

U.S. PATENT DOCUMENTS 2,854,672 A    10/1958   Hagstrom
3,898,704 A     8/1975   Gallaher et al.
(Continued)

FOREIGN PATENT DOCUMENTS

AT        405735 B       11/1999
CN       1132711 A       10/1996
(Continued)

OTHER PUBLICATIONS

International Search Report and Written Opinion mailed Aug. 7, 2013, for International Patent Application No. PCT/US2013/039476.
(Continued)

*Primary Examiner* — Tien Dinh
*Assistant Examiner* — Richard R Green
(74) *Attorney, Agent, or Firm* — Karceski IP Law, PLLC

(57) ABSTRACT

A seating arrangement includes a seat with a seating surface and a top bunk disposed adjacent to the seat. The seat and the top bunk are configurable between a first configuration and a second configuration. In the first configuration, the seat accommodates a user in a seated position and the top bunk is stowed. In the second configuration, the seat and the top bunk form a bunk bed configured to accommodate users in prone positions. In the first configuration, the seating surface
(Continued)

is disposed at a first predetermined height. In addition, in the second configuration, the seating surface is disposed at a second predetermined height that is lower than the first predetermined height.

23 Claims, 33 Drawing Sheets

(51) Int. Cl.
<table>
<tr><td><i><b>B60N 2/62</b></i></td><td>(2006.01)</td></tr>
<tr><td><i><b>B60N 2/24</b></i></td><td>(2006.01)</td></tr>
<tr><td><i><b>B65D 17/00</b></i></td><td>(2006.01)</td></tr>
<tr><td><i><b>B64D 11/00</b></i></td><td>(2006.01)</td></tr>
</table>

(52) U.S. Cl.
CPC .......... *B64D 11/06* (2013.01); *B64D 11/0642* (2014.12); *B64D 11/0643* (2014.12); *B65D 17/165* (2013.01); *B64D 2011/0069* (2013.01); *B64D 2011/0084* (2013.01); *Y02T 50/46* (2013.01)

(58) Field of Classification Search
CPC .. B64D 2011/0069; B60N 2/34; B61D 31/00; B61D 33/0021
See application file for complete search history.

(56) References Cited

U.S. PATENT DOCUMENTS

| | | | |
|---|---|---|---|
| 4,071,210 A | 1/1978 | Mutke | |
| 4,868,939 A | 9/1989 | Tagtow | |
| 4,955,973 A | 9/1990 | Provencher | |
| 5,754,995 A | 5/1998 | Behrendt | |
| 5,768,724 A | 6/1998 | Buell | |
| 6,000,659 A | 12/1999 | Brauer | |
| 6,056,239 A | 5/2000 | Cantu et al. | |
| 6,073,883 A | 6/2000 | Ohlmann et al. | |
| 6,152,400 A | 11/2000 | Sankrithi et al. | |
| 7,070,149 B2 | 7/2006 | McDonnell | |
| 7,077,360 B2 | 7/2006 | Jacob | |
| 7,156,462 B2 | 1/2007 | Verny et al. | |
| 7,182,404 B2 * | 2/2007 | Laurent | B64D 11/0641 297/173 |
| 7,188,806 B2 * | 3/2007 | Beroth | B64D 11/0601 244/118.6 |
| 7,350,850 B2 | 4/2008 | Rasmsen | |
| 7,354,018 B2 | 4/2008 | Saint-Jalmes | |
| 7,419,214 B2 | 9/2008 | Plant | |
| 7,681,951 B2 | 3/2010 | Doebertin et al. | |
| 7,798,446 B2 | 9/2010 | Park | |
| 7,946,532 B2 | 5/2011 | Martin | |
| 7,975,962 B2 | 7/2011 | Jacob | |
| 7,997,531 B2 | 8/2011 | Bettell | |
| 8,882,036 B2 * | 11/2014 | Henshaw | B64D 11/0641 244/118.6 |
| 2007/0200392 A1 * | 8/2007 | Eiswirth | B60N 2/34 296/190.02 |
| 2009/0243358 A1 * | 10/2009 | Henshaw | B64D 11/0641 297/340 |
| 2010/0193634 A1 | 8/2010 | Hankinson et al. | |
| 2011/0114789 A1 | 5/2011 | Ergenci et al. | |

FOREIGN PATENT DOCUMENTS

| | | |
|---|---|---|
| CN | 101516729 A | 8/2009 |
| DE | 29702660 U1 | 5/1997 |
| EP | 1104362 A1 | 6/2001 |
| FR | 2753170 A1 | 3/1998 |
| GB | 589980 | 7/1947 |
| GB | 715114 | 9/1954 |
| GB | 1014128 | 9/1966 |
| HR | P20030927 A2 | 2/2006 |
| WO | WO 03013903 A1 | 2/2003 |
| WO | WO 2011077364 A1 | 6/2011 |
| WO | WO 2013052784 A1 | 4/2013 |

OTHER PUBLICATIONS

Chinese Office Action dated Oct. 19, 2015, for Chinese Patent Application No. 201380023592.2.
Chinese Office Action dated Aug. 17, 2016, for Chinese Patent Application No. 21380023592.2.

* cited by examiner

SEATING ARRANGEMENT CONVERTIBLE TO A BUNK BED

CROSS-REFERENCE TO RELATED APPLICATION(S)

This is a National Stage Entry into the United States Patent and Trademark Office from International PCT Patent Application No. PCT/US2013/039476, having an international filing date of May 3, 2013, which relies for priority on U.S. Provisional Patent Application Ser. No. 61/642,509, entitled "SEATING ARRANGEMENT CONVERTIBLE TO A BUNK BED," filed May 4, 2012, the entire contents of both of which are hereby incorporated by reference in their entireties.

FIELD OF THE INVENTION

The present invention concerns furniture for moving vehicles, particularly aircraft. The present invention concerns a seating arrangement that may be converted into a bunk bed.

DESCRIPTION OF THE RELATED ART

There are numerous rules and regulations that encompass air travel. Among these many rules, regulatory agencies worldwide, commercial carriers, and private carriers frequently impose restrictions on the number of hours that a particular flight crew may work before being required to rest. As should be apparent, such restrictions are designed to prevent crews from working to the point (or beyond the point) of exhaustion.

Modern aircraft are designed to travel considerably longer distances than aircraft in the past. While distances for aircraft have increased, the operational speed of most aircraft has remained relatively unchanged. As a result, while modern aircraft are able to fly to a more remote destination, it takes proportionately longer for the aircraft to reach that further destination.

To comply with existing regulations concerning the number of hours a particular crew may fly, it has become increasingly necessary for aircraft designers to incorporate sleeping and rest areas in aircraft. When equipped with such rest areas, one crew remain working while to the second crew sleeps.

Numerous solutions to this problem have been implemented by various aircraft manufacturers for various airplane designs.

As should be immediately apparent to those skilled in the art, large, commercial aircraft are more easily modified to include a crew rest area than smaller aircraft, simply because they have more room in which to accommodate resting crews. For those aircraft that have not been modified to incorporate a separate crew sleeping area, designers often provide a privacy curtain, which permits a section of the passenger compartment to be cordoned off, permitting crew members to rest during a flight.

For some aircraft designs, separate crew quarters are provided.

U.S. Patent Application Publication No. 2011/0114789 (hereinafter "the '789 Application") describes a unit for accommodating members of an aircraft crew. The crew rest compartment, which is illustrated in FIG. 1, includes several units 101, 102, 103, 104, 105 that encompass sleeping and stowage compartments. (The '789 Application at paragraph [0095].) The crew rest compartment is designed to be separate from the passenger area of the aircraft.

Similarly, U.S. Pat. No. 3,898,704 (hereinafter "the '704 patent") describes a convertible seat-bed equipment that may be provided to permit crew members to rest and sleep in privacy during long flights. (The '704 patent at col. 1, lines 23-24.) The '704 patent takes advantage of the space adjacent to the door 12 through which passengers enter and exit the aircraft. (The '704 patent at col. 2, lines 33-36.) Specifically, a seat is provided in the entry/exit area that may be converted from a seat, where the occupant is upright, into an upper bunk bed. A lower bunk bed may be erected beneath the upper bed by assembling elements that are stored behind the seat. (See, e.g., the '704 patent at FIGS. 1 and 2; see also the '704 patent at col. 2, line 62, through col. 3, line 17.)

In U.S. Pat. No. 6,152,400 (hereinafter "the '400 patent"), a sleeping compartment is provided in the belly of the aircraft, in the space beneath the cabin floor 12 of the aircraft. (See, e.g., the '400 patent at FIGS. 2 and 4.)

In U.S. Pat. No. 6,073,883 (hereinafter "the '883 patent"), a sleeping compartment is provided above the passenger area, in the space above and between the overhead storage bins on the aircraft. (See, e.g., the '883 patent at FIGS. 2 and 4.)

In U.S. Pat. No. 7,070,149 (hereinafter "the '149 patent"), seats are described that are convertible into sleeper bunks. Specifically, in one configuration, which is shown in FIG. 2, the backrests of seats on an aircraft form a top bunk while the seat cushions are configured to form a bottom bunk. In an alternative embodiment, which is shown in FIG. 3, the seat cushions are raised to form the second bunk, thereby providing room for a third bunk on the floor of the aircraft. (See the '149 patent at FIGS. 2 and 3.)

Noticeably absent from the prior art are solutions to the problem of a sleeping area provided in smaller aircraft. Understandably, the solutions proposed by the above-identified references, which are designed to be incorporated into larger aircraft, are not easily incorporated into smaller jet aircraft due to space constraints and considerations.

In smaller aircraft, such as business or personal aircraft, there are more limited design options when incorporating a rest area into the aircraft cabin.

Accordingly, the prior art leaves room for the development of aircraft furniture that may accommodate crew members when at rest during extended length flights.

It is noted that the prior art includes examples of couches that are convertible to bunk beds.

For example, Croatian Patent No. HR P20030927 describes a couch that is convertible into bunk beds by pivoting a backrest into a horizontal position. The seating area becomes the bottom bunk and the backrest becomes the top bunk.

Similarly, U.S. Pat. No. 2,854,672 describes a folding couch bunk bed with a similar arrangement that may be used in camping trailers and the like.

It is also noted that there are examples where forward-facing seats are convertible into bunk beds. The '149 patent is one example.

Despite these examples of prior art, which are not presented in the context of a crew rest area in an aircraft, the prior art does not offer a suitable solution when addressing the concerns of a crew rest area for a small jet aircraft.

SUMMARY OF THE INVENTION

The present invention seeks to address one or more of the deficiencies noted with respect to the prior art.

Specifically, the present invention provides a seating arrangement for an aircraft that may accommodate person(s) thereon in a seated manner. The seating arrangement may be converted to a bunk bed that accommodates crew members by providing a convenient sleeping area within the aircraft cabin.

Specifically, the present invention offers a seating arrangement that, when the seating arrangement is in the seat configuration, the occupant is in a forward-facing position. The seat is reconfigurable to form the lower bunk of a bunk bed, when in the bunk bed configuration.

The present invention, therefore, provides both a convenient crew and/or passenger seating area, which doubles as a crew/passenger sleeping facility.

The seating arrangement of the present invention, when configured as a sleeping facility, maximizes sleeping space volume while preserving a modest footprint within the aircraft cabin.

The seating arrangement of the present invention provides this sleeping facility within the height restrictions of the aircraft cabin, which is defined at least in part by the sidewall (or fuselage wall) of the aircraft.

One aspect of the seating arrangement of the present invention permits the creation of upper and lower bunk beds within the height restrictions of an aircraft by permitting, among other features, the lowering of a height of the seating surface, which permits the establishment of a lower bunk, despite the limited space adjacent to the aircraft sidewall.

The present invention provides a seating arrangement that includes a seat including a seating surface and a top bunk disposed adjacent to the seat. The seat and the top bunk are configurable between a first configuration and a second configuration. In the first configuration, the seat accommodates a user in a seated position and the top bunk is stowed. In the second configuration, the seat and the top bunk form a bunk bed configured to accommodate users in prone positions. In the first configuration, the seating surface is disposed at a first predetermined height. In the second configuration, the seating surface is disposed at a second predetermined height that is lower than the first predetermined height.

It is contemplated that the seat may further include a leg rest connected to and moveable in relation to a front end of the seating surface, a back rest with a bottom end and a top end, the bottom end being connected to and moveable in relation to a rear end of the seating surface, and a head rest connected to and moveable in relation to a top end of the back rest.

In one contemplated embodiment, the seating arrangement includes armrests pivotally attached to respective sides of the back rest.

In another contemplated embodiment, the back rest and armrests for the seating configuration are configured such that the back rest and armrests form a contiguous surface when the armrests are folded adjacent to the back rest.

In addition, it is contemplated that the back rest and the armrests are configured to form a contiguous surface, establishing part of a lower bunk, when the seat is in the second configuration.

The present invention also contemplates that the seating arrangement includes at least two vertical supports extending upwardly adjacent to the seat, the two vertical supports being pivotally connected to the top bunk to permit the top bunk to pivot between the first and second configurations.

Next, it is contemplated that the seating arrangement will be configured such that the seat and the top bunk are attachable to tracks in a floor supporting the seat and the top bunk.

Still another contemplated embodiment includes an ottoman disposed a predetermined distance from the seat. The ottoman includes an ottoman cushion. In the first configuration, the ottoman cushion is disposed at the first predetermined height and, in the second configuration, the ottoman cushion is disposed at the second predetermined height.

In the embodiment with an ottoman, it is contemplated that, in the second configuration, the leg rest, back rest, head rest, and ottoman cushion together form a lower bunk beneath the top bunk.

It is contemplated that the ottoman cushion and the leg rest include adjacent edges with shapes that complement one another. In one version, the ottoman cushion includes a bulged section and the leg rest includes an indentation along the adjacent edges that complement one another.

In the seating arrangement of the present invention, the seat also may include a seat frame supporting the seat. The seat frame is anticipated to include a seat frame scissor element permitting the seating surface to transition between the first predetermined height and the second predetermined height.

The seat frame scissor element is contemplated that include a first scissor element with a first top end and a first bottom end and a second scissor element with a second top end and a second bottom end. The first scissor element is pivotally connected at a first point between the first top end and the first bottom end to the second scissor element at a second point between the second top end and the second bottom end. The first top end is pivotally and slidably connected beneath a forward end of the seat cushion. The first bottom end is pivotally connected to a rear end of a structural element disposed beneath the seat cushion. The second top end is pivotally connected beneath a rear end of the seat cushion. The second bottom end is pivotally and slidably connected to a forward end of the structural element.

The ottoman is contemplated to include an ottoman frame supporting the ottoman cushion, the ottoman frame including an ottoman frame scissor element permitting the ottoman cushion to transition between the first predetermined height and the second predetermined height.

The ottoman frame scissor element may have a first scissor element with a first top end and a first bottom end and a second scissor element with a second top end and a second bottom end. The first scissor element is pivotally connected at a first point between the first top end and the first bottom end to the second scissor element at a second point between the second top end and the second bottom end. The first top end is pivotally connected beneath a first side end of the ottoman cushion. The first bottom end is pivotally and slidably connected to a second side end of a structural element disposed beneath the ottoman cushion. The second top end is pivotally and slidably connected beneath a second side end of the ottoman cushion. The second bottom end is pivotally connected to a first side end of the structural element.

In one contemplated embodiment, it is anticipated that the seating arrangement may include at least two vertical supports extending upwardly adjacent to the seat and to the ottoman, the two vertical supports being pivotally connected to the top bunk to permit the top bunk to pivot between the first and second configurations.

Still further, the seat, the top bunk, and the ottoman may be attachable to tracks in a floor supporting the seat, the top bunk, and the ottoman.

In another embodiment, an upper side cushion may be disposed adjacent a top edge of the top bunk when in the first configuration. If so, the upper side cushion forms a portion of a top bunk bed when in the second configuration.

Additionally, a lower side cushion may be disposed adjacent a bottom edge of the top bunk when in the first configuration. If so, the lower side cushion forms a portion of a bottom bunk bed when in the second configuration.

While the seating arrangement of the present invention may be employed in any type of vehicle, it is contemplated that the seating arrangement may be adapted for an aircraft cabin.

In one embodiment contemplated for an aircraft, when positioned within the aircraft cabin, and when in the first configuration, the top bunk is contemplated to be stowed adjacent to a wall of the aircraft.

In the embodiment contemplated for an aircraft, a privacy compartment may surround the seating arrangement when positioned within the aircraft cabin.

Other aspects and features of the present invention will be made apparent from the discussion that follows, as should be understood by those skilled in the art.

BRIEF DESCRIPTION OF THE DRAWINGS

The present invention will now be described in connection with the drawings appended hereto, in which.

DETAILED DESCRIPTION OF EMBODIMENT(S) OF THE INVENTION

Figure 1:
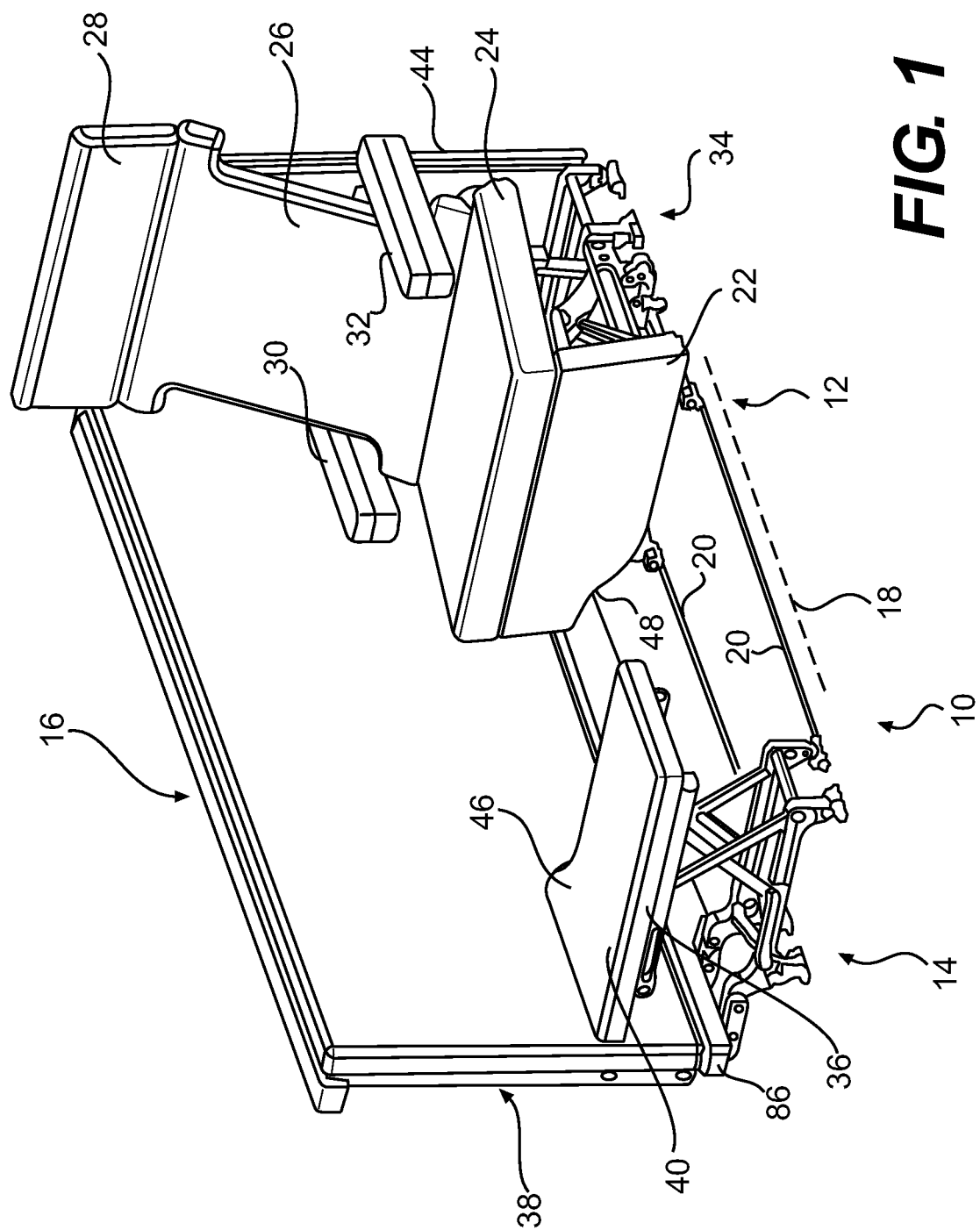
FIG. 1 is a perspective view of one contemplated embodiment of the seating arrangement of the present invention, with the seat being showing in a fully upright position.

The present invention will now be described in connection with one or more contemplated embodiments. The embodiments that are described are intended to be exemplary of the present invention and not limiting of the scope thereof. In other words, while attention is focused on specific embodiments of the present invention, those embodiments are not intended to limit the present invention. To the contrary, the embodiments are intended to be exemplary of the breadth and scope of the present invention. Any discussion, therefore, of specific embodiments is not intended to be limiting of the present invention.

As noted above, the seating arrangement of the present invention is intended for installation on smaller diameter jet aircraft of the type commonly purchased by corporations and individuals. While it is contemplated that the present invention will be employed as furniture on these smaller diameter aircraft, the present invention is not intended to be limited solely to such an environment. It is envisioned that the seating arrangement of the present invention may be employed on any size aircraft.

In the alternative, it is contemplated that the seating arrangement of the present invention may be employed in other types of vehicles including, but not limited to, boats, vans, trains, trucks, recreational vehicles, etc. Accordingly, the seating arrangement of the present invention should not be understood as being limited for use in only one potential environment.

With respect to the embodiments described herein, specific materials are discussed for the various elements of the seating arrangement of the present invention. Any discussion of a particular material is intended to be exemplary of the types of materials that may be employed and is not intended to be limiting of the present invention. Other materials may be used for the construction of the seating arrangement of the present invention without departing from the scope of the present invention.

In addition, it is noted that several embodiments of the seating arrangement of the present invention are mechanically operated. In other words, several of the disclosed embodiments are intended to be manipulated manually between the first and second orientations (e.g., between the seating and bunk bed orientations). A manually manipulated seating arrangement offers an advantage in that the seating arrangement is light in weight, because it does not incorporate electrical motors and/or pneumatic equipment to assist with transitioning between the seating orientation and the bunk bed orientation. While a mechanical operation offers a light weight construction, which is beneficial for aircraft where any additional weight potentially reduces the flight range for the aircraft, electrical, pneumatic, electro-mechanical, and other devices may be incorporated into the seating arrangement without departing from the scope of the present invention.

As should be apparent to those skilled in the art, the flight range (or "range") of an aircraft is a function of the distance that an aircraft may fly, when fully loaded, as measured from a point of origin. The range of an aircraft is dependent upon a number of variables that include, but is not limited to, the weight of the aircraft, its fuel capacity, and its maximum allowable take-off weight. As the weight of the aircraft increases, the range of the aircraft decreases. Since the take-off weight of an aircraft places an upper limit on the aircraft, there is a limited amount of fuel that the aircraft may take on and remain within its take-off limit. It is also noted aircraft also have a maximum zero fuel weight limit. Therefore, any added weight (in the form of furniture) adversely affects the payload capacity of that aircraft.

Concerning directional conventions employed in the aircraft industry, it is noted that terms used to describe aircraft are the same employed to describe boats in a nautical context. For example, the front of the aircraft is referred to as the "fore" section, the rear of the aircraft is referred to as the "aft" section, the left side of the aircraft is referred to as the "port" side, and the right side of the aircraft is referred to as the "starboard" side. In addition, a person standing on the floor of the aircraft interior is at an "inboard" position, while a person standing outside of the aircraft is at an "outboard" position. FIG. 1 is a perspective illustration of a first embodiment of the seating arrangement 10 of the present invention.

The seating arrangement 10 includes at least three components: (1) the seat 12, (2) the ottoman 14, and (3) the top bunk 16. All three of these components of the seating arrangement 10 are shown in FIG. 1.

In connection with FIG. 1, an alternative embodiment includes two components: (1) the seat 12 and (2) the top bunk 16. In this alternative embodiment, the seat may be configured to form the lower bunk bed without the need for an ottoman 14. As such, in this alternative contemplated embodiment, the ottoman 14 is excluded.

Returning to FIG. 1, it is noted that the seating arrangement 10 is contemplated to be positioned within an aircraft (not shown) parallel to the longitudinal axis 18 of the aircraft, such that the seat 12 faces forward. In an alternative contemplated arrangement, the seat 12 may be positioned so that it faces the rear of the aircraft. As should be apparent, while these orientations are contemplated for the seating arrangement 10 of the present invention, the seating arrangement 10 may be placed in an aircraft with any suitable orientation without departing from the scope of the present invention. For example, the seating arrangement 10 may be positioned transversely to the longitudinal axis 18 of the aircraft.

With respect to the forward-facing orientation, it is contemplated that the seating arrangement 10 will be positioned opposite from an exit doorway (not shown) of the aircraft. While this positioning suggests one suitable location for the seating arrangement 10 of the present invention, the seating arrangement 10 may be placed anywhere within the aircraft without departing from the scope of the present invention. The exact location of the seating arrangement 10, therefore, is not considered to be limiting of the present invention.

Various frame elements of the seating arrangement 10 are contemplated to be attached to tracks 20 that are incorporated into the floor of the interior cabin of the aircraft. The tracks 20 are contemplated to be the tracks 20 that are commonly installed in aircraft, as should be understood by those skilled in the art. As should be apparent, however, the seating arrangement 10 may be installed in any manner suitable for aircraft construction.

As illustrated in FIG. 1, for example, the seat 12 includes a leg rest 22, a seat cushion 24, a back rest 26, a head rest 28, and two armrests 30, 32. The leg rest 22, seat cushion 24, back rest 26, head rest 28, and armrests 30, 32 are articulable with respect to one another so that the seat 12 may transition from the seating configuration shown in FIG. 1 to the bunk bed configuration shown in FIG. 14, for example. The seat 12 is supported by a frame 34, the details of which are discussed in greater detail below.

The ottoman 14 is contemplated to be disposed a predetermined distance from the seat 12. As detailed below, the ottoman 14 cooperates with the seat 12 to form the lower bunk of the bunk bed, when the seating arrangement is in the bunk bed configuration. The ottoman 14 includes a top cushion 40 that is disposed on a frame 36, the details of which are discussed below.

In the seating configuration, which is illustrated in FIG. 1, the top bunk 16 is positioned vertically adjacent to the seat 12 and the ottoman 14. The top bunk 16 is supported on a frame 38.

As will be made apparent from the discussion that follows, the frames 34, 36, 38 interconnect with one another. Specifically, the frames 34, 36 are understood to connect to the tracks 20 in the floor of the aircraft cabin. The frame 38 connects the frames 34, 36 to one another. In this manner the seating arrangement 10 may be constructed as a cohesive, frame structure that may be incorporated into the interior of the aircraft. The frames 34, 36, 38 cooperate to establish a suitable support for individuals when the seating arrangement 10 is in the bunk bed configuration.

The frames 34, 36, 38 are contemplated to be made from an aluminum material. An aluminum material is a material made from aluminum or an alloy thereof. Aluminum is used in aircraft parts manufacture because of its strength and light weight. While aluminum and/or alloys containing aluminum are contemplated for the elements that make up the frames 34, 36, 38, other materials may be employed without departing from the scope of the present invention. For example, the frames may be made from iron-containing materials, including steels. Still further, the frames 34, 36, 38 may be made from plastics, ceramics, composite materials, or the like. The exact composition of the frames 34, 36, 38 is not critical to the operation of the present invention, as should be apparent to those skilled in the art.

Figure 2:
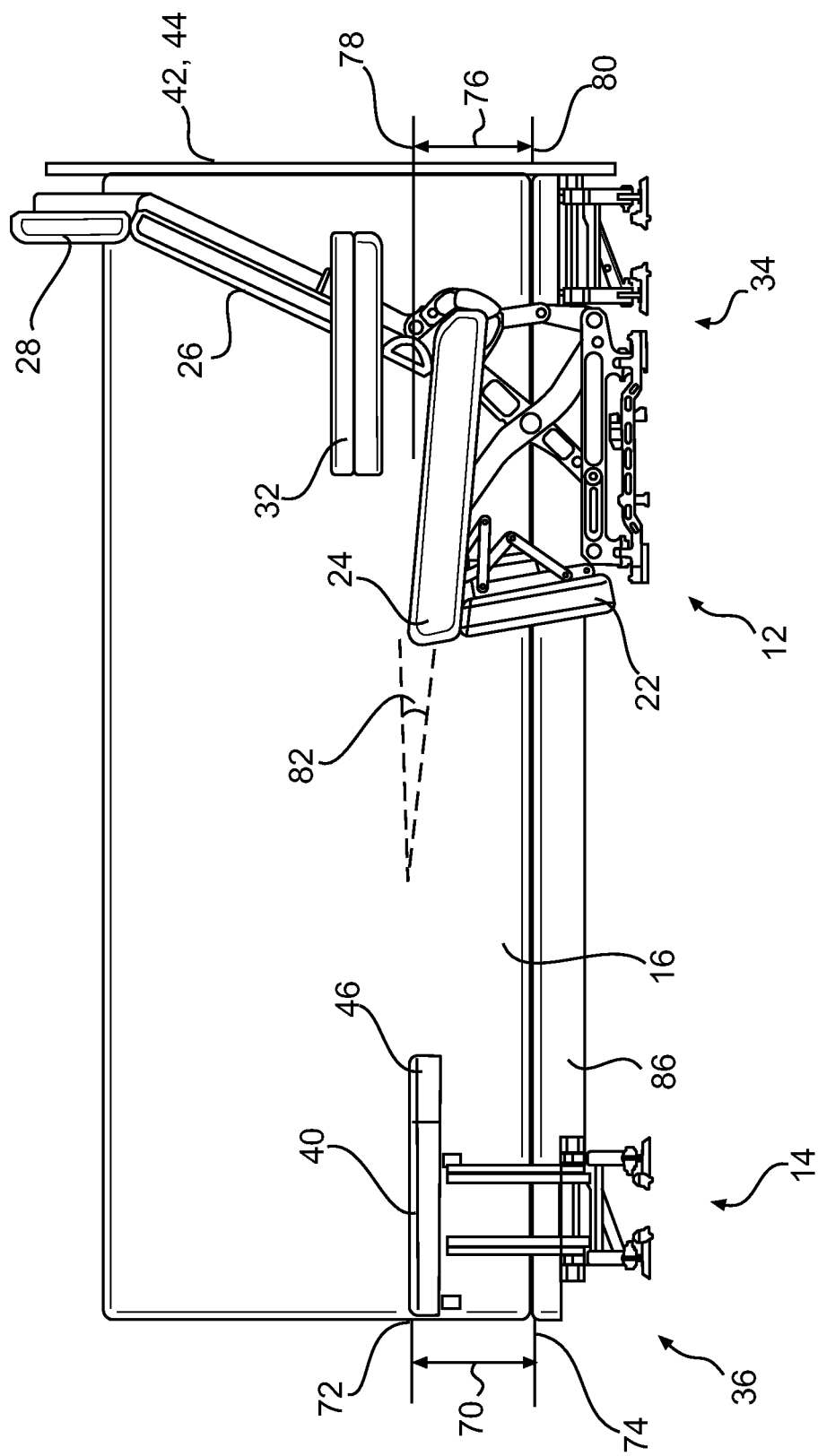
FIG. 2 is a front view of the seating arrangement illustrated in FIG. 1.

FIG. 2 is a front view of the seating arrangement 10 of the present invention. In this view, the seat 12 is in the upright position. This upright position may be appropriate for taxi, take-off, and landing (otherwise known as "TTL"). If so, the seat 12 is in the TTL position, as should be understood by those skilled in the art.

With respect to FIG. 2, the seating arrangement 10 is understood to be positioned adjacent to the exterior wall (or fuselage wall) of the aircraft. As such, the view shown in FIG. 2 is taken from an inboard position, looking either to the port or starboard sides of the aircraft. While this is contemplated as one possible orientation of the seating arrangement 10 of the present invention, other positions may be employed without departing from the scope of the present invention.

It is contemplated that the seat 12 will be sized to accommodate one adult. Specifically, the seat is sized to accommodate a $95^{th}$ percentile male. A $95^{th}$-percentile male is a male person that meets the physical characteristics of an average male within the $95^{th}$ percentile of the human population, with respect to physical dimensions. The $95^{th}$-percentile male, therefore, is a mathematical construct that is employed by designers, as should be apparent to those skilled in the art. Since this construct is a known design tool, a definition of the construct is not provided herein.

In connection with the $95^{th}$-percentile male, reference is made to a publication by Henry Dreyfuss Associates, entitled "The Measure of Man & Woman: Human Factors in Design" (2001). That publication (including subsequent editions) is incorporated herein by reference to provide support for any body type, including the $95^{th}$-percentile male discussed herein. This definition is not intended to be limiting of the present invention, as the design standards are understood to change over time. However, this publication provides a convenient reference for those wishing to comprehend design parameters associated with (or in reference to) the human body.

As should be apparent, two smaller-sized individuals may occupy the seat 12 without departing from the scope of the present invention. It is noted that the seat 12 is not contemplated to be a two-person seat, as a general rule. However, a seat 12 that accommodates two or more persons is contemplated to fall within the scope of the present invention.

Figure 3:
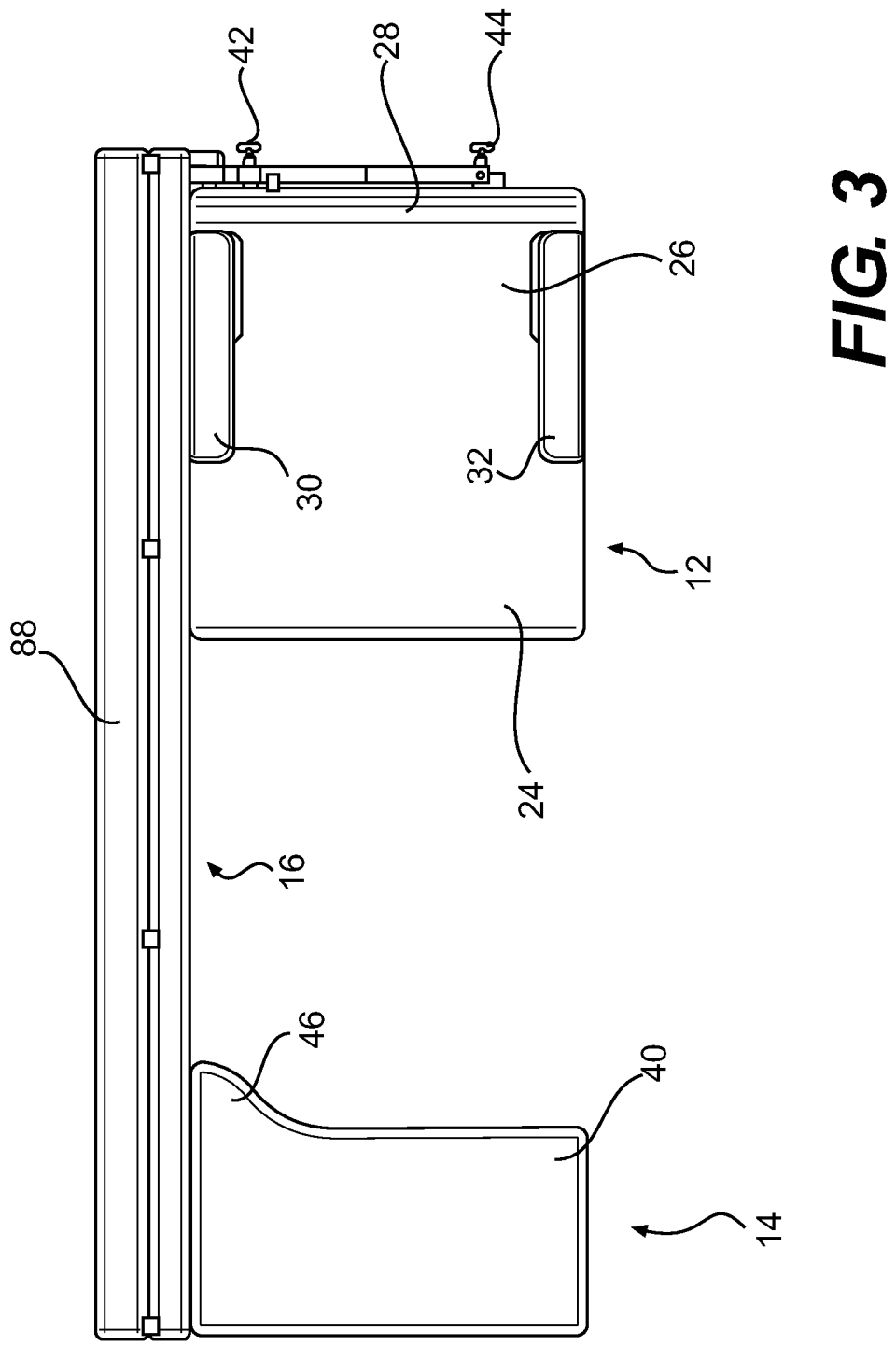
FIG. 3 is a top view of the seating arrangement shown in FIG. 1.

FIG. 3 is a top view of the seating arrangement 10 of the present invention. The positional relationship between the seat 12, the ottoman 14, and the top bunk 16 is shown.

In addition, as is apparent in FIG. 3, two seat rails 42, 44 are disposed behind the seat 12. The two seat rails 42, 44 are disposed vertically with respect to a plane of the floor of the aircraft cabin. The seat rails 42, 44 are provided to guide the seat 12 in its transition from the TTL position to bunk bed position.

In one contemplated embodiment, the seat rails 42, 44 are connected to, and extend upwardly from, the seat frame 34. In another contemplated embodiment, the seat rails 42, 44 may be embedded in a wall structure (or divider) that is positioned behind the seat 12. Other variations also are contemplated to fall within the scope of the present invention.

FIG. 3 also illustrates that the top cushion 40 in the ottoman 14 includes a bulged portion 46 that extends toward the seat 12 at the side of the ottoman 14 closest to the top bunk 16. As illustrated, for example, in FIG. 7, the bulged portion 46 mates with an indented portion 48 on the leg rest 22 of the seat 12. The bulged portion 46 is provided to help position the leg rest 22 adjacent to the top cushion 40 when the seat 12 is in the bunk bed orientation, as illustrated in FIG. 1, for example. In other words, the bulged portion 46 is complimentary to the indented portion 48. It is contemplated that the indented portion 48 may be provided and configured to clear one or more obstructions that may be present on or near the floor of the aircraft. For example, it is contemplated that the indentation 48 may be provided to clear a floor air duct under the side cushion 86 when the seat 12 is in the seating orientation.

It is noted that the inclusion of the bulged portion 46 and the indented portion 48 are merely exemplary of one contemplated embodiment of the present invention. It is contemplated that the top cushion 40 of the ottoman 14 and the leg rest 22 of the seat 12 may mate along a line that presents any suitable shape or configuration. Alternatively, the leg rest 22 and the top cushion 40 of the ottoman 14 may mate along a straight line and, therefore, exclude any bulged portions 46, indentations 48, or other complimentary shapes.

Figure 4:
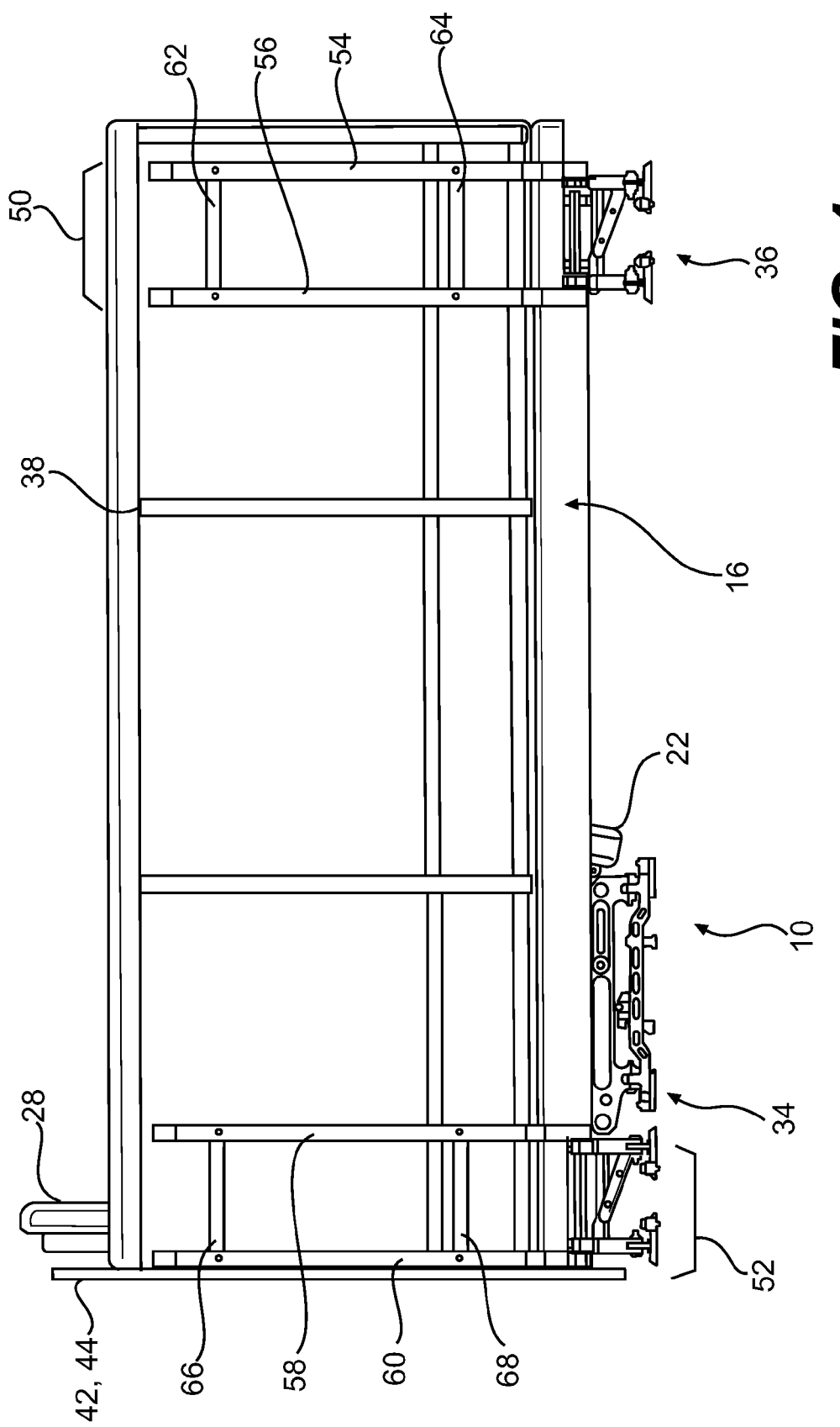
FIG. 4 is a rear view of the seating arrangement illustrated in FIG. 1.

FIG. 4 is a rear view of the seating arrangement 10 of the present invention. In this view, the underside of the top bunk 16 is clearly visible as is the top bunk frame 38. Portions of the seat frame 34 and the ottoman frame 36 also are visible in this illustration. As illustrated in this view, the top bunk frame 38 includes two vertical supports 50, 52, which are connected to or associated with the seat frame 34 and the ottoman frame 36. Each of the vertical supports includes two vertical frame elements 54, 56, 58, 60. The vertical supports 50, 52 also include horizontal braces 62, 64, 66, 68. As should be apparent to those skilled in the art, the number of vertical frame elements 54, 56, 58, 60 and/or horizontal braces 62, 64, 66, 68 is not critical to the construction of the present invention. A larger or a smaller number may be employed without departing from the scope of the present invention.

Figure 5:
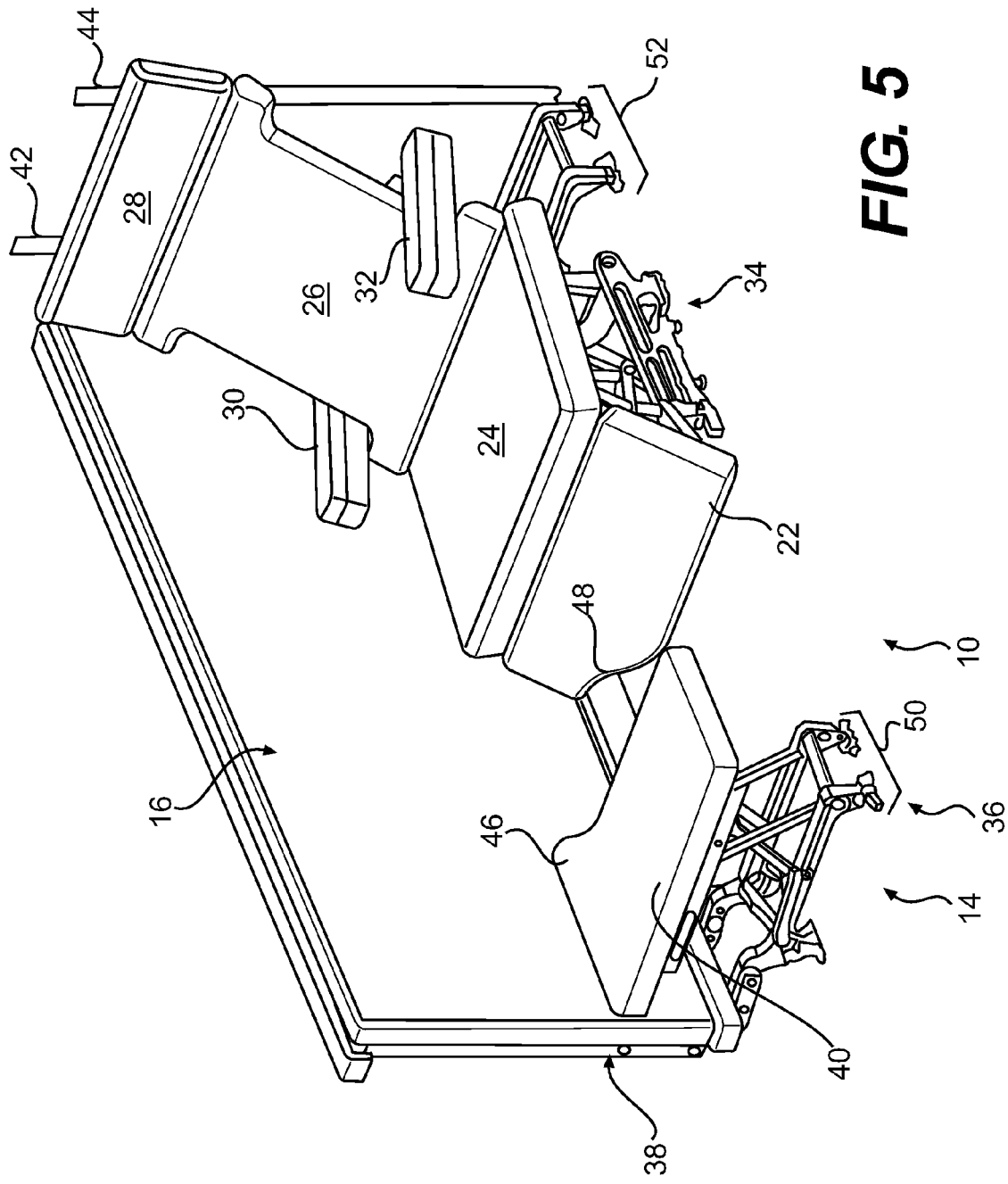
FIG. 5 is a perspective illustration of the seating arrangement shown in FIG. 1, with the seat being shown in a partially reclined position.

FIG. 5 is a perspective illustration of the seating arrangement 10 of the present invention. The seating arrangement 10 is shown with the seat 12 in a partially reclined position. The partially reclined position might be one configuration that the seat 12 is placed in during flight.

As should be apparent in FIG. 5, the seat frame 34 is distinct from the vertical support frame 52. Alternatively, the two frames 34, 52 may be connected to one another.

In the embodiment depicted in FIG. 5, the seat frame is distinct from the support frame 52. This permits the seat frame 34 to move under the seat 12 as the seat transitions from the TTL position to one or more partially reclined positions.

Figure 6:
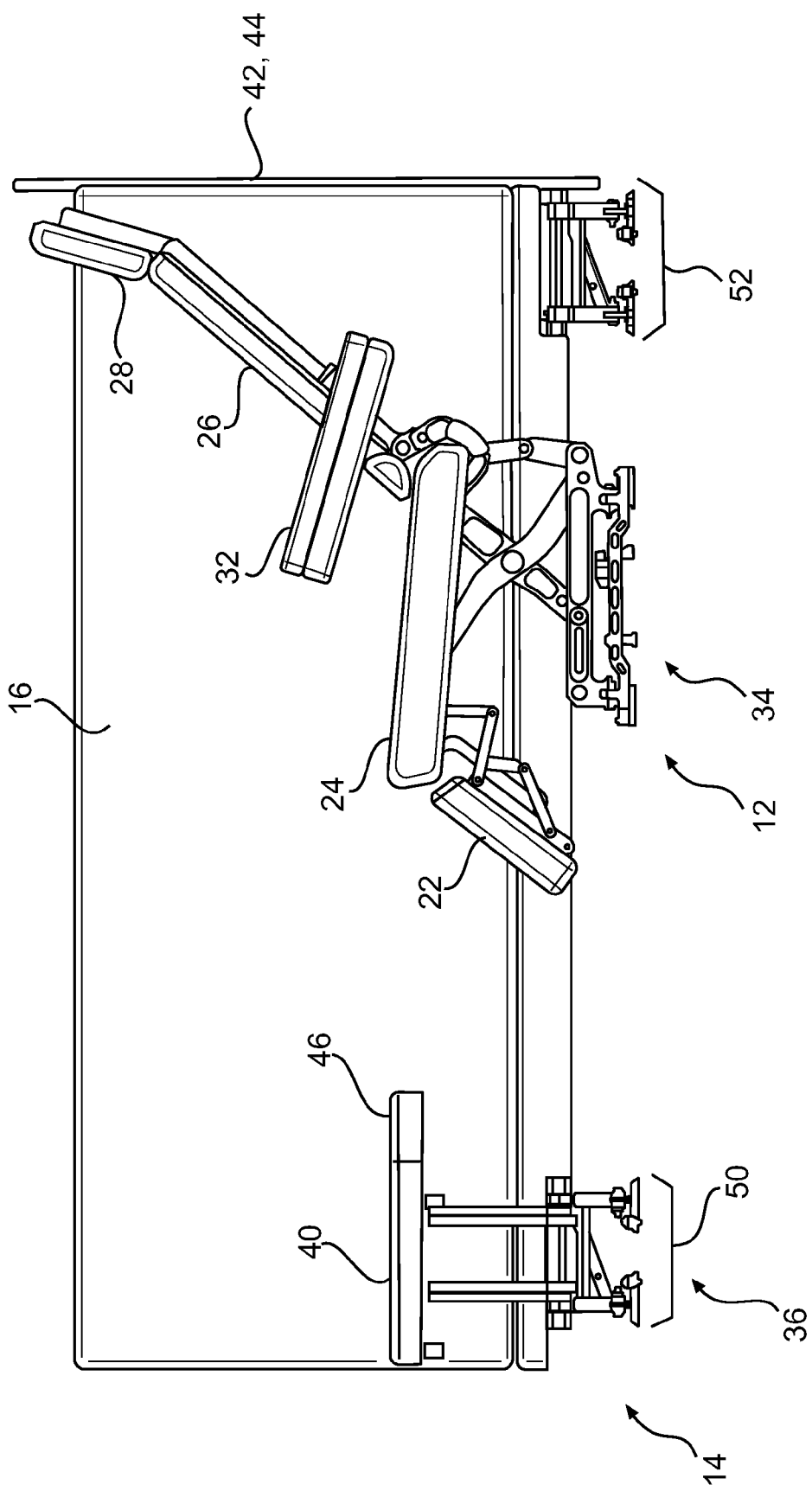
FIG. 6 is a front view of the seating arrangement in the position shown in FIG. 5.

FIG. 6 is a side view of the seating arrangement 10 that is depicted in FIG. 5. In this view, details of the frames 34, 36, 38 are more readily discernible, as are the support frames 50, 52.

It is noted that the ottoman frame 36 and the support frame 50 share similar structural elements and, therefore, form a singular structure. Were it desirable for the ottoman 14 to move within the tracks 20 like the seat 12, the frame 36 could be decoupled from the support frame 50 without departing from the scope of the present invention.

Figure 7:
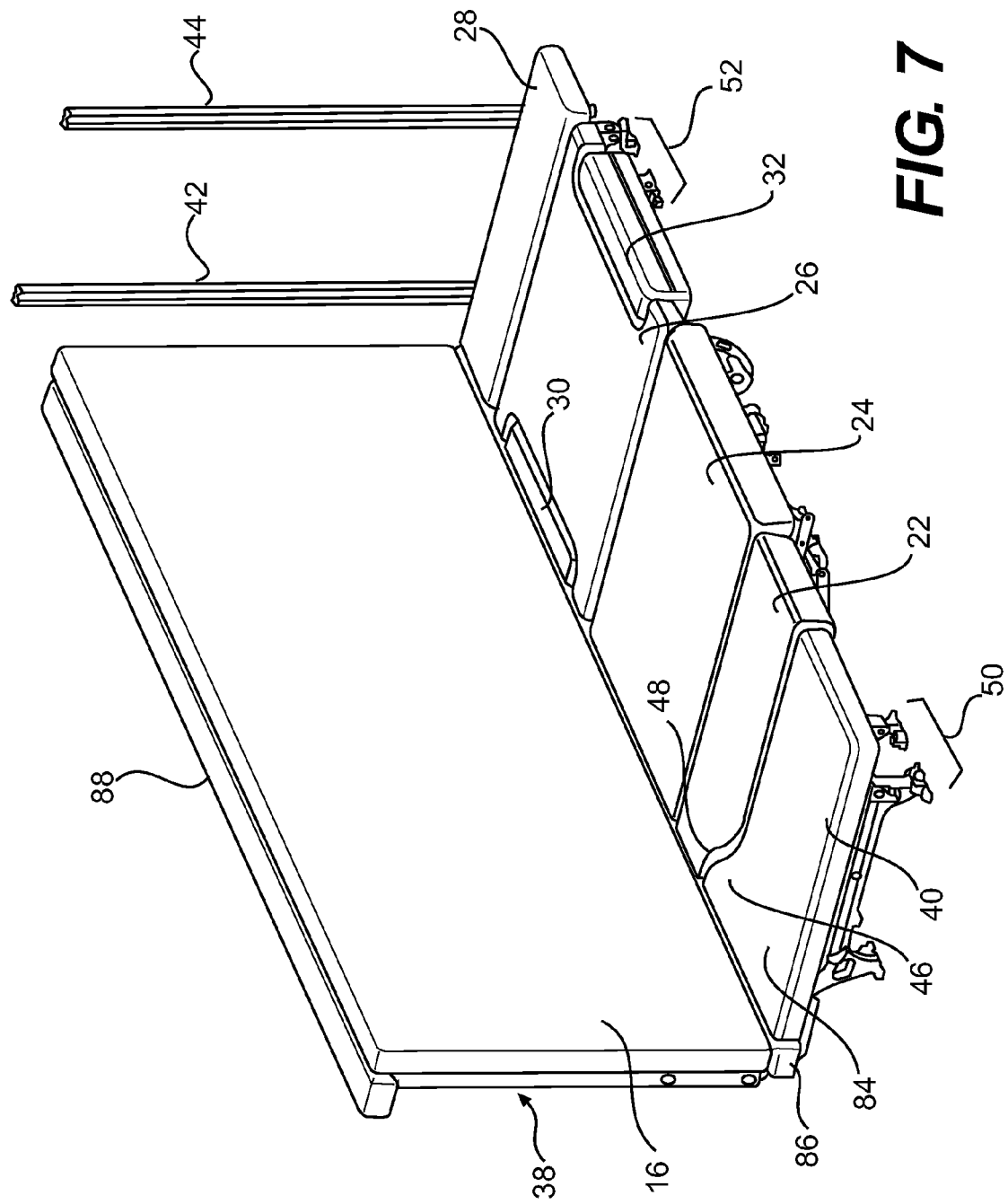
FIG. 7 is a perspective illustration of the seating arrangement shown in FIG. 1, with the seat being shown in the first orientation where the seat forms the lower bunk of the bunk bed.

FIG. 7 is a perspective illustration of the seating arrangement 10 of the present invention, where the seat 12 and ottoman 14 are in the bunk bed position or orientation. As should be apparent, in the bunk bed orientation, the top cushion 40 of the ottoman 14 and the various cushions 22, 24, 26, 28 of the seat 12 are at a height lower than the height of the seat cushion 24 when the seat is in the TTL position or the partially reclined positions as illustrated in FIGS. 1 and 5, for example.

With renewed reference to FIG. 2, the change in height 70 of the top cushion 40 of the ottoman 14 is shown. Specifically, the top cushion 40 of the ottoman 14 transitions from a first position 72 to a second position 74. In the second position 74, the top cushion 40 is flush with a side cushion 86. The change in height 76 of the seat cushion 24 also is shown. The seat cushion 24 transitions from a first position 78 to a second position 80. In the second position 80, the seat cushion 24 is flush with the side cushion 86.

As should be apparent from FIG. 2, the seat cushion 24 is contemplated to be at an angle 82 with respect to a horizontal plane, at least when the seat 12 is in one or more of the seated positions. When the seat cushion 24 forms the lower bunk, however, the seat cushion 24 is anticipated to be parallel with a horizontal reference plane. In other words, the angle 82 is anticipated to be 0 degrees. As should be apparent, the angle 82 may be of any magnitude, to accommodate any of an infinite variety of positions for the seat 12, without departing from the scope of the present invention.

With continued reference to FIG. 7, it is contemplated that all of the elements of the seat 12 and the ottoman 14 will help to establish the surface 84 of the lower bunk. In this regard, it is noted that the armrests 30, 32 are configured to fold into the sides of the back rest 26. The armrests 30, 32 become flush with the surface of the back rest 26 when the seat 12 is in the bunk bed position. It is noted that the armrests 30, 32 also may be configured to fold such that they are flush with the back rest 26 when the set 12 is in one of its seating positions. In this manner, it is possible that the seat 12 may be configured to become an armless chair for one or more occupants.

Figure 8:
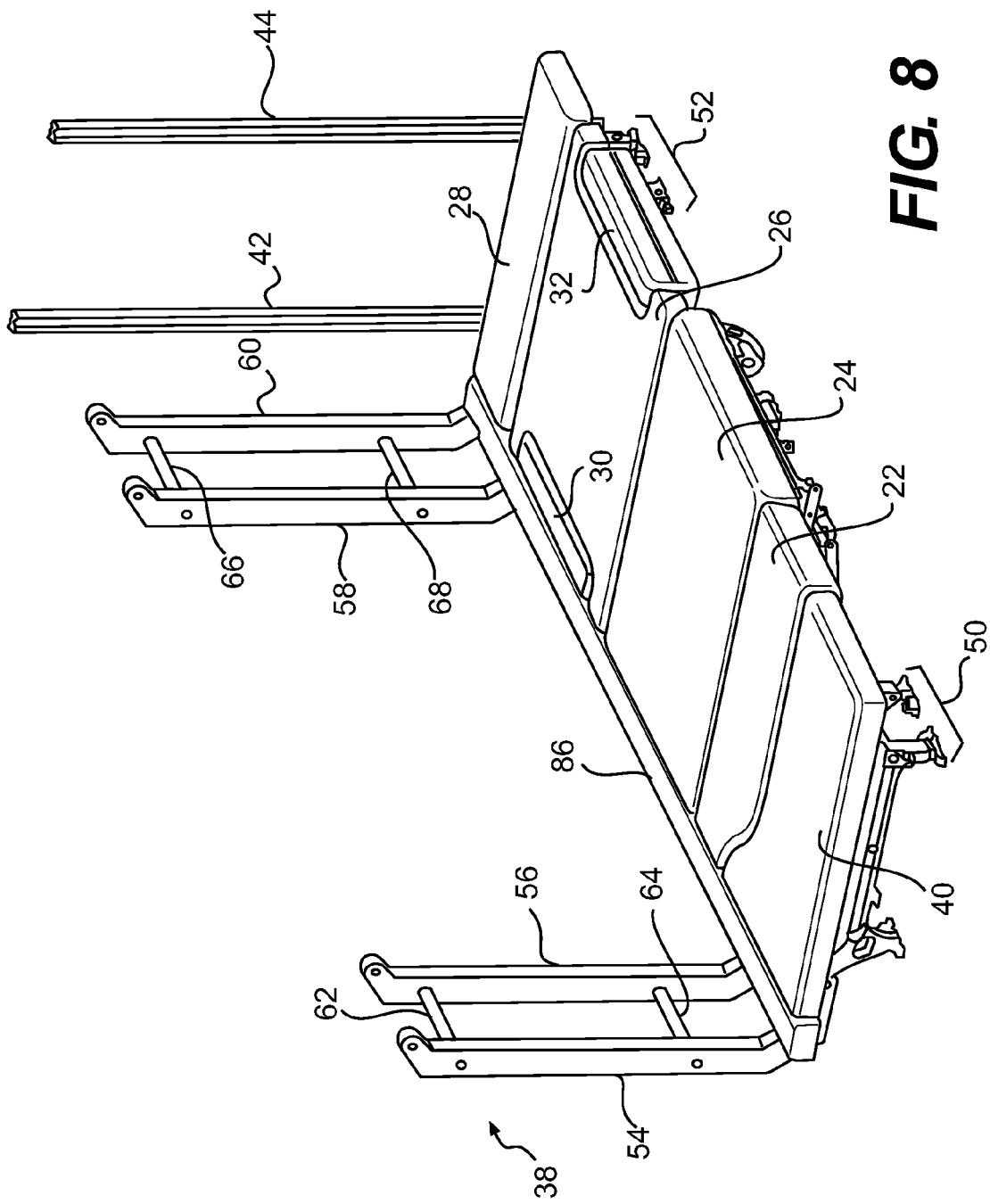
FIG. 8 is a perspective illustration of the seating arrangement shown in FIG. 7, where the top bunk (in addition to other elements) has been removed to better illustrate the structural components of the seating arrangement of the present invention.

FIG. 8 is a perspective illustration of a portion of the seating arrangement 10. As in FIG. 7, the seat 12 and ottoman 14 have been placed into the bunk bed position.

Figure 9:
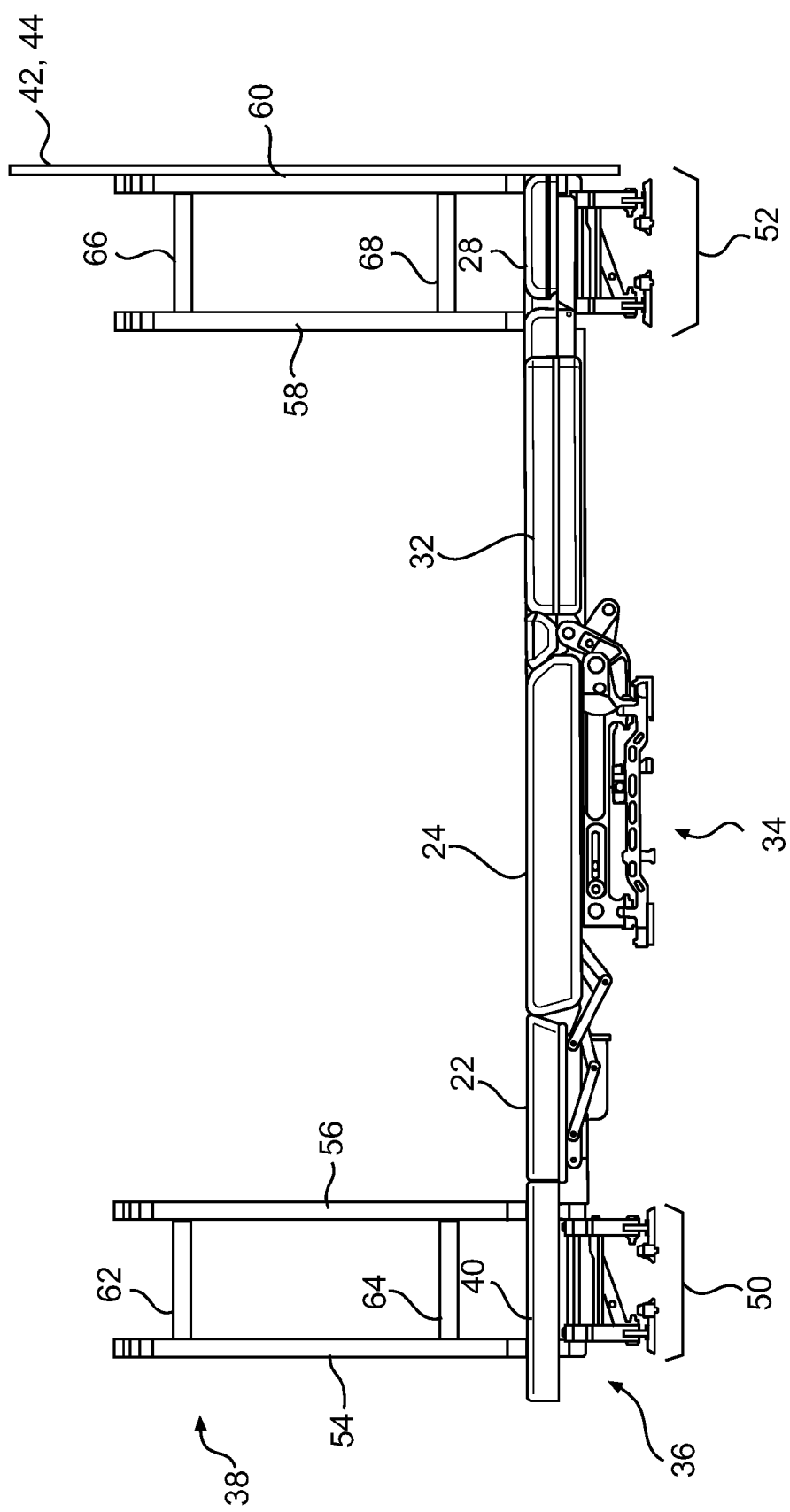
FIG. 9 is a front view of the portion of the seating arrangement shown in FIG. 8.

FIG. 9 is a front view of the seating arrangement 10 that is shown in FIG. 8. With respect to this illustration, it is noted that the seat frame 34 is not in the same position as illustrated in FIG. 2, for example. Specifically, the seat frame 34 has moved toward the ottoman 14 by a predetermined distance. As noted above, it is contemplated that the seat frame 34 will move within the tracks 20 in the floor of the aircraft. As a result, it is contemplated that the seat frame 34 will remain positioned beneath the seat cushion 24 when the seat 12 is in either the seated position or in the bunk bed orientation.

In an alternative embodiment, it is contemplated that the seat frame 34 may remain fixed in a particular location within the aircraft. If so, the seat frame 34 is contemplated to articulate in a manner that differs from the construction illustrated throughout the various figures of the present patent application. It is noted that the exact construction and operation of the seat frame 34 is not critical to this present invention.

Figure 10:
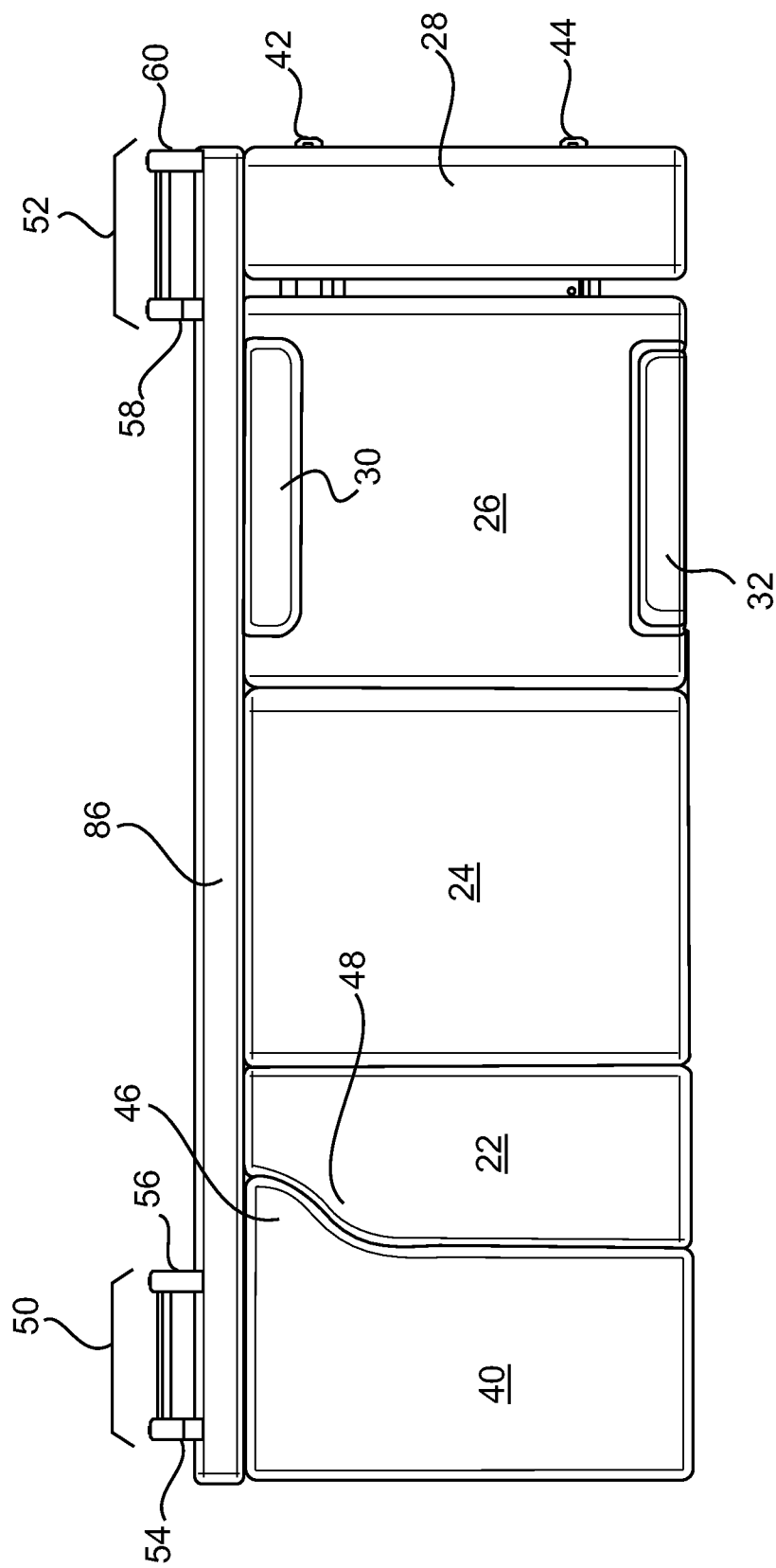
FIG. 10 is a top view of the portion of the seating arrangement shown in FIG. 7.

FIG. 10 is a top view of the seat 12 and the ottoman in the bunk bed orientation or configuration. This view is consistent with the orientation illustrated in FIG. 9.

Figure 11:
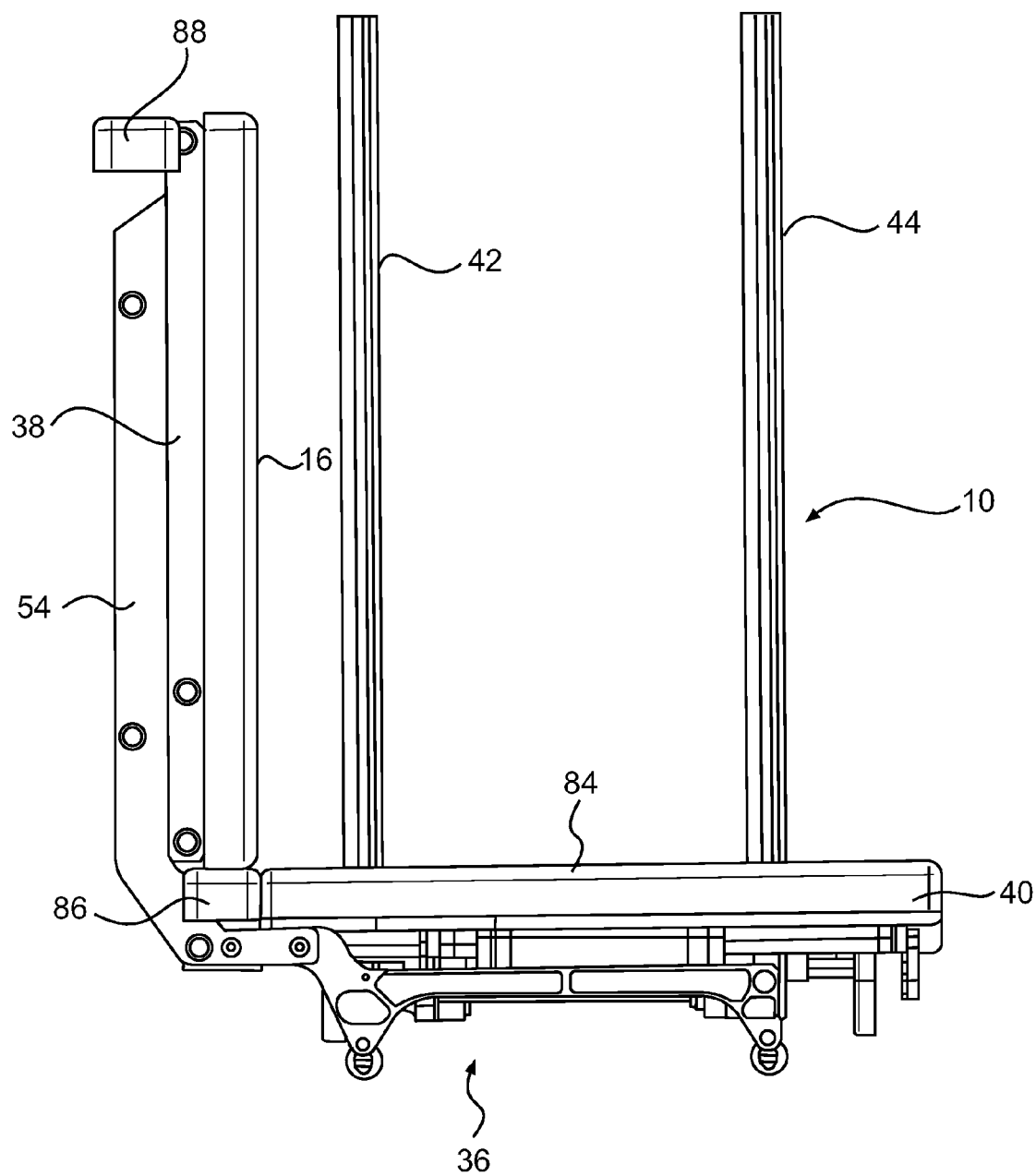
FIG. 11 is an end view of the seating arrangement shown in FIG. 7, illustrating the seat in the bunk bed configuration, before the top bunk bed has been moved into the bunk bed configuration.

FIG. 11 is an end view (or a side view) illustration of the seating arrangement 10 of the present invention. This view is consistent with the orientation depicted in FIG. 10.

In this view, the upper side cushion 88 is clearly visible. The lower side cushion 86 also is visible. As should be apparent to those skilled in the art, the upper side cushion 88 and the lower side cushion 86 extend the surfaces of the upper and lower bunk beds when the seating arrangement 10 is in the bunk bed orientation.

Figure 12:
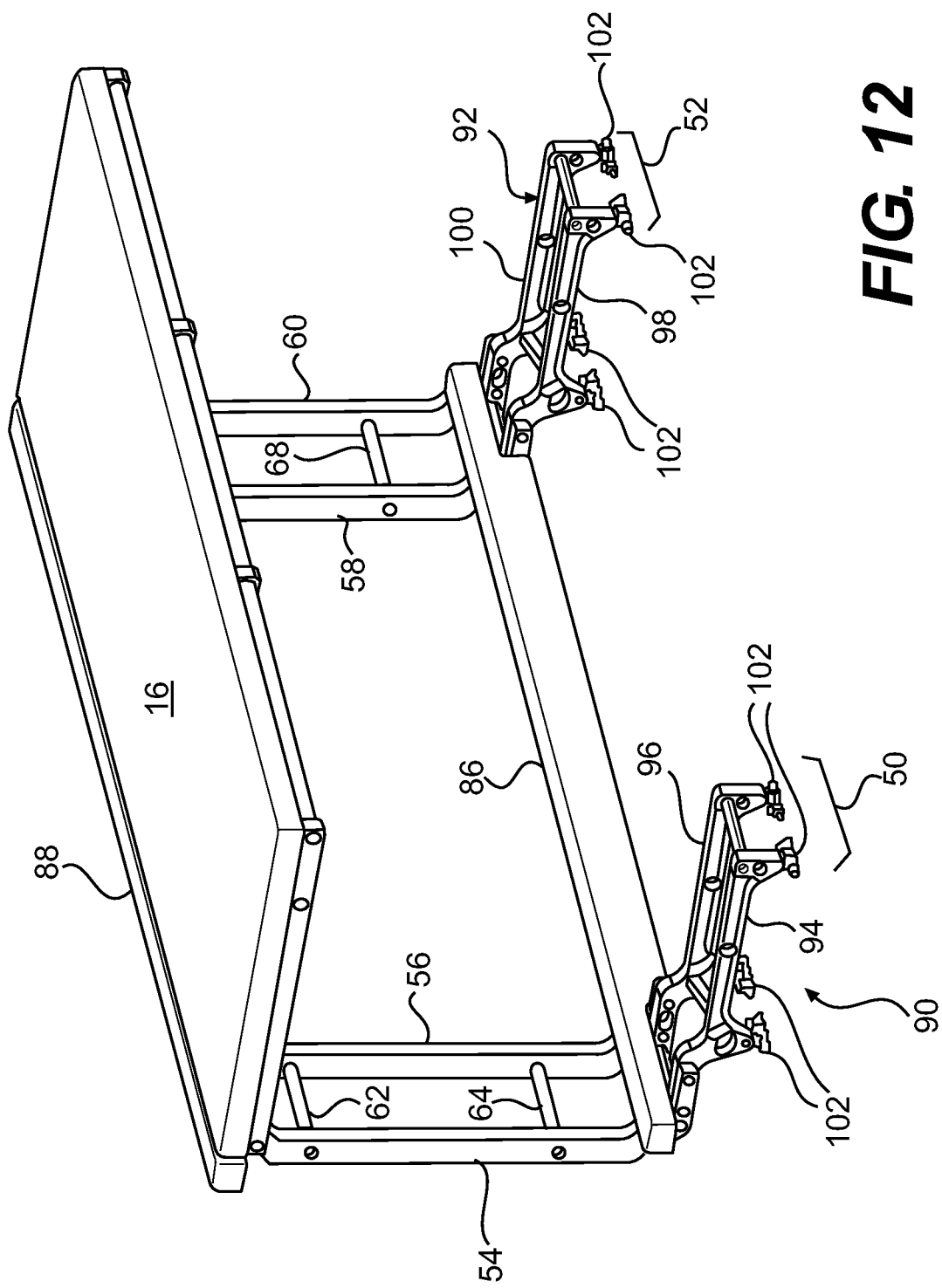
FIG. 12 is a perspective illustration of a portion of the seating arrangement of the present invention, showing the top bunk in the bunk bed configuration, with elements of the bottom bunk having been removed to better illustrate the seating arrangement of the present invention.

FIG. 12 is a perspective illustration of the seating arrangement 10 of the present invention, showing the upper bunk 16 in the bunk bed orientation. The lower bunk has been removed for purposes of the illustration.

The vertical support frames 50, 52 are shown in FIG. 12. The support frames 50, 52 include lower frame elements 90, 92, which include individual horizontal elements 94, 96, 98, 100. The horizontal elements 94, 96, 98, 100 include feet 102 that connect to the tracks in the floor of the aircraft's interior cabin. The lower cushion 86 and the upper side cushion 88 may be structural elements that help to reinforce the frame structure that defines the seating arrangement 10 of the present invention.

Figure 13:
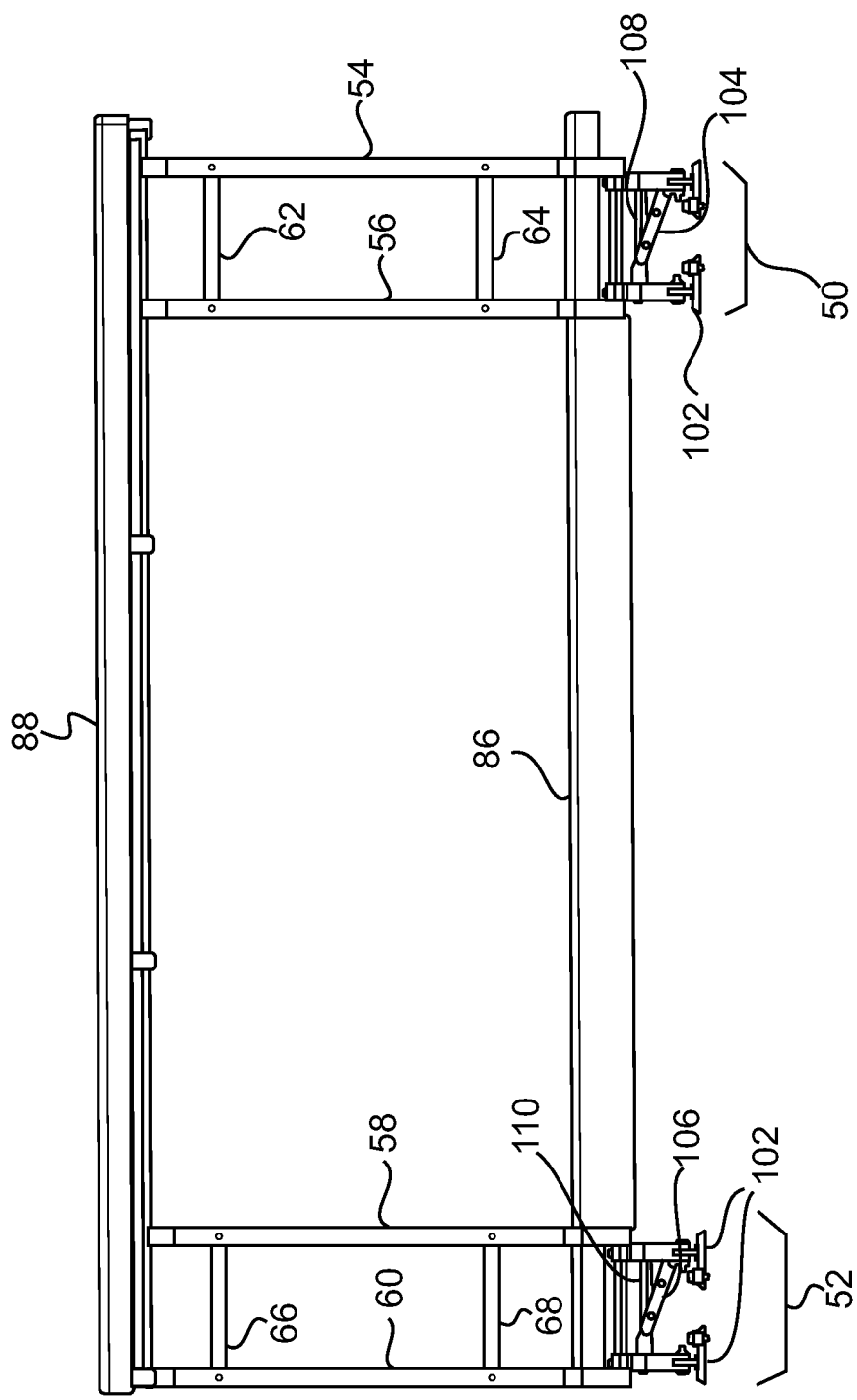
FIG. 13 is a rear view of the portion of the seating arrangement illustrated in FIG. 12.

FIG. 13 is a front view of the seating arrangement 10, shown in the bunk bed orientation. In this view, diagonal connectors 104, 106 are visible. Horizontal connectors 108, 110 also are visible. The diagonal connectors 104, 106 and the horizontal connectors 108, 110 form part of the frame elements 50, 52 of the seating arrangement 10.

Figure 14:
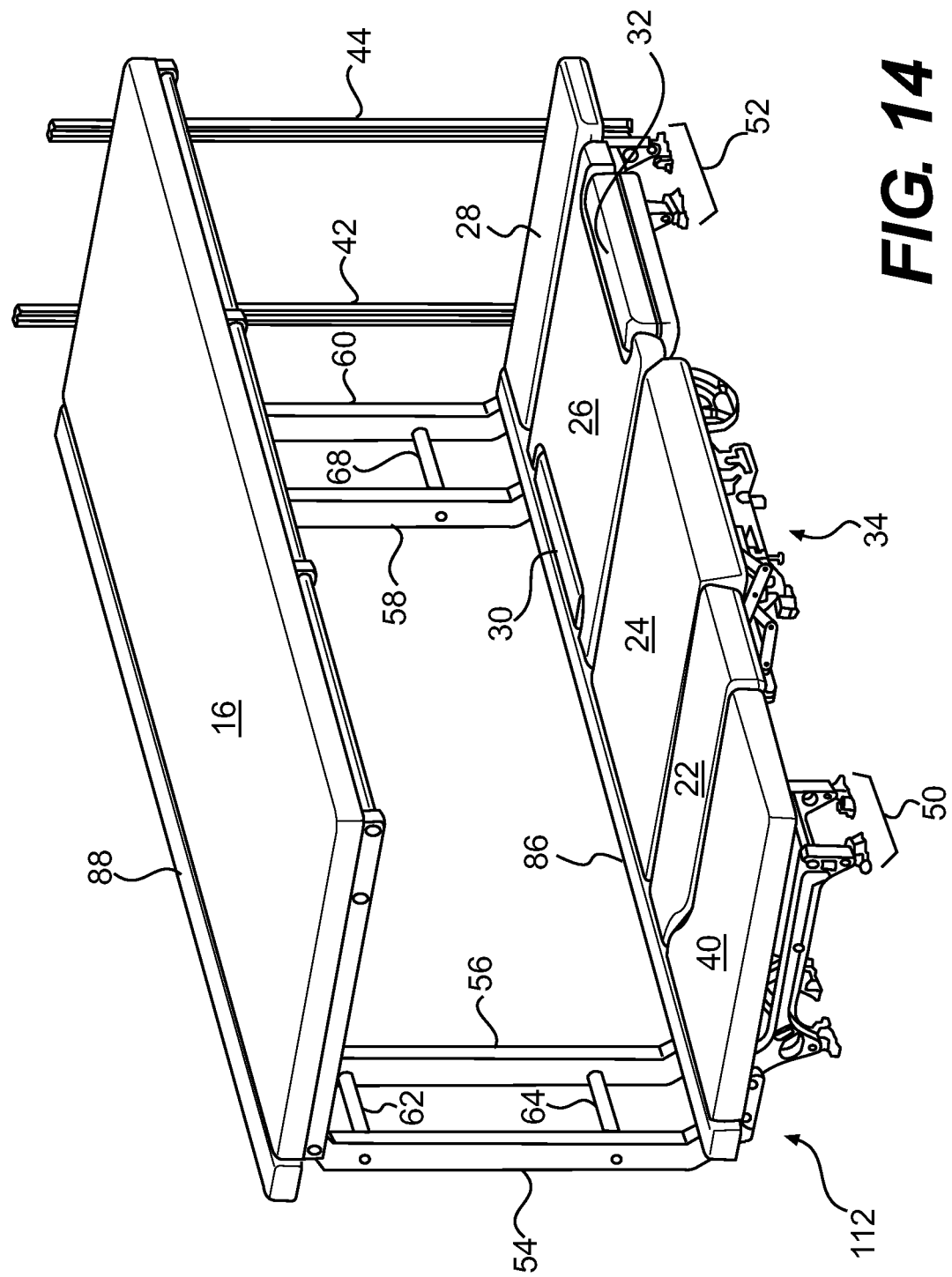
FIG. 14 is a perspective illustration of the seating arrangement of the present invention, with the seat and the top bunk both being shown in the bunk bed configuration.

FIG. 14 is a perspective illustration of the seating arrangement 10. In this view, the complete upper bunk 16 and lower bunk 112 are visible, along with other aspects of the seating arrangement 10 of the present invention. It is noted that the reference number "112" has been added to designate the lower bunk and distinguish it from the upper bunk when the seating arrangement 10 is in the bunk bed orientation.

Figure 15:
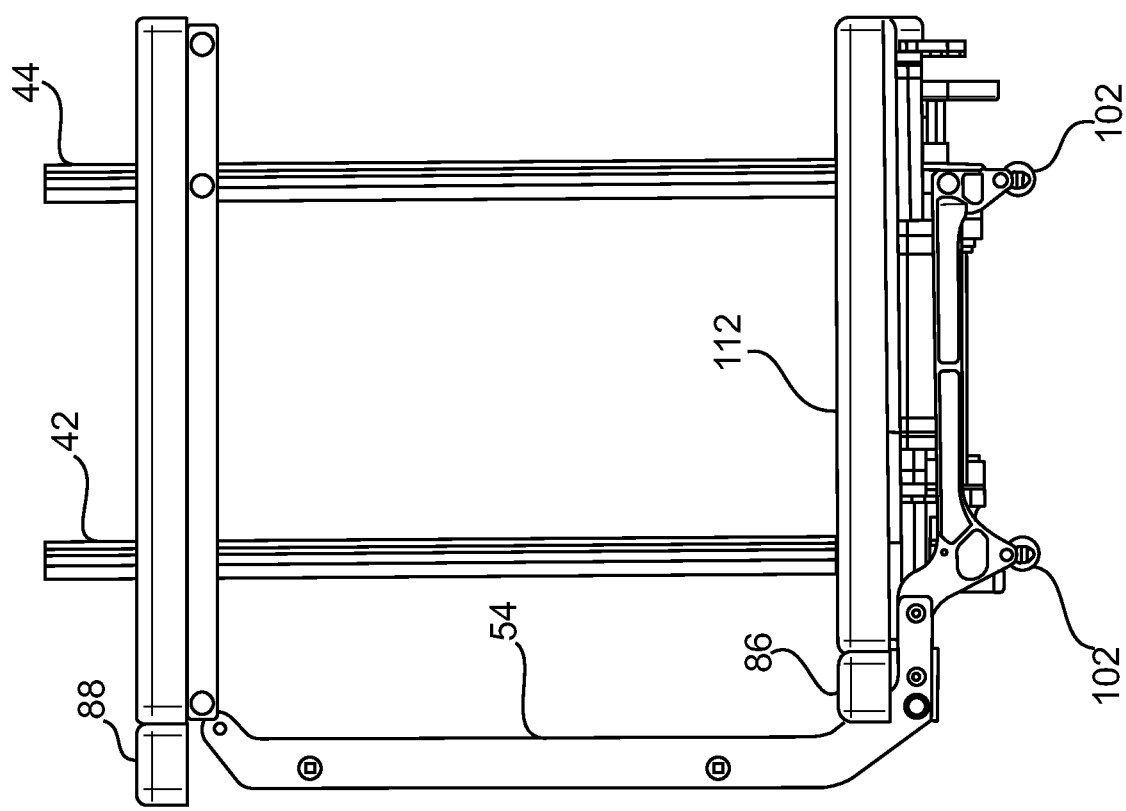
FIG. 15 is an end view of the seating arrangement shown in FIG. 14, with the seat and top bunk being shown in the bunk bed configuration.

FIG. 15 is an end view of the portion of the seating arrangement 10 of the present invention, consistent with the bunk bed orientation shown in FIG. 14.

Figure 16:
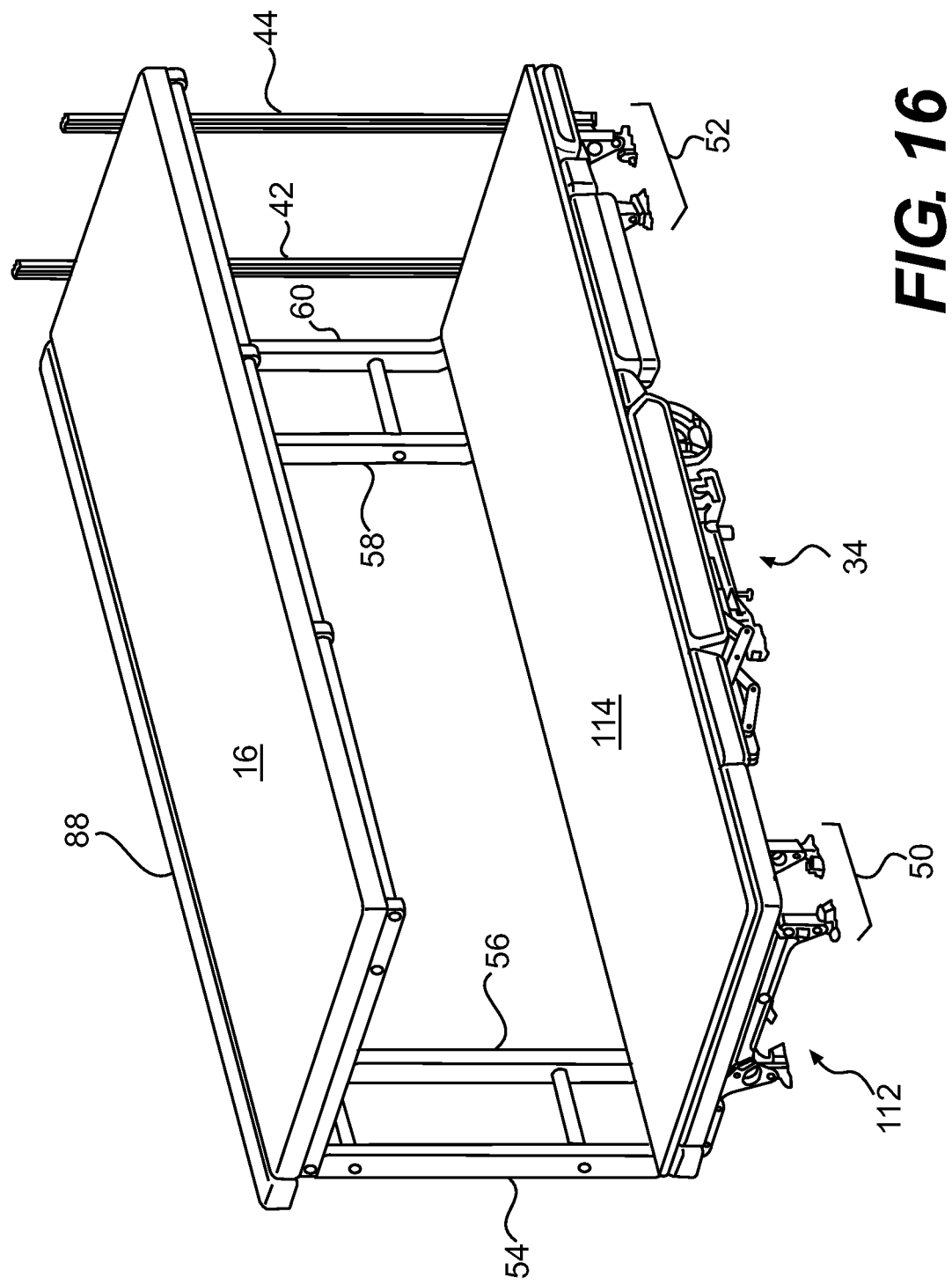
FIG. 16 is a perspective illustration of the seating arrangement of the present invention, shown in the bunk bed configuration, including a mattress pad on the lower bunk.

FIG. 16 is a perspective illustration of the seating arrangement 10 in the bunk bed orientation. In this view, which is similar to the perspective presented by FIG. 14, a mattress pad 114 has been added to the lower bunk 112. The mattress pad 114 is contemplated to provide a more uniform sleeping surface for the lower bunk 112. As should be apparent, a mattress pad 114 may be added to the upper bunk 16. It is noted that a mattress pad 114 is not required to practice the present invention.

Figure 17:
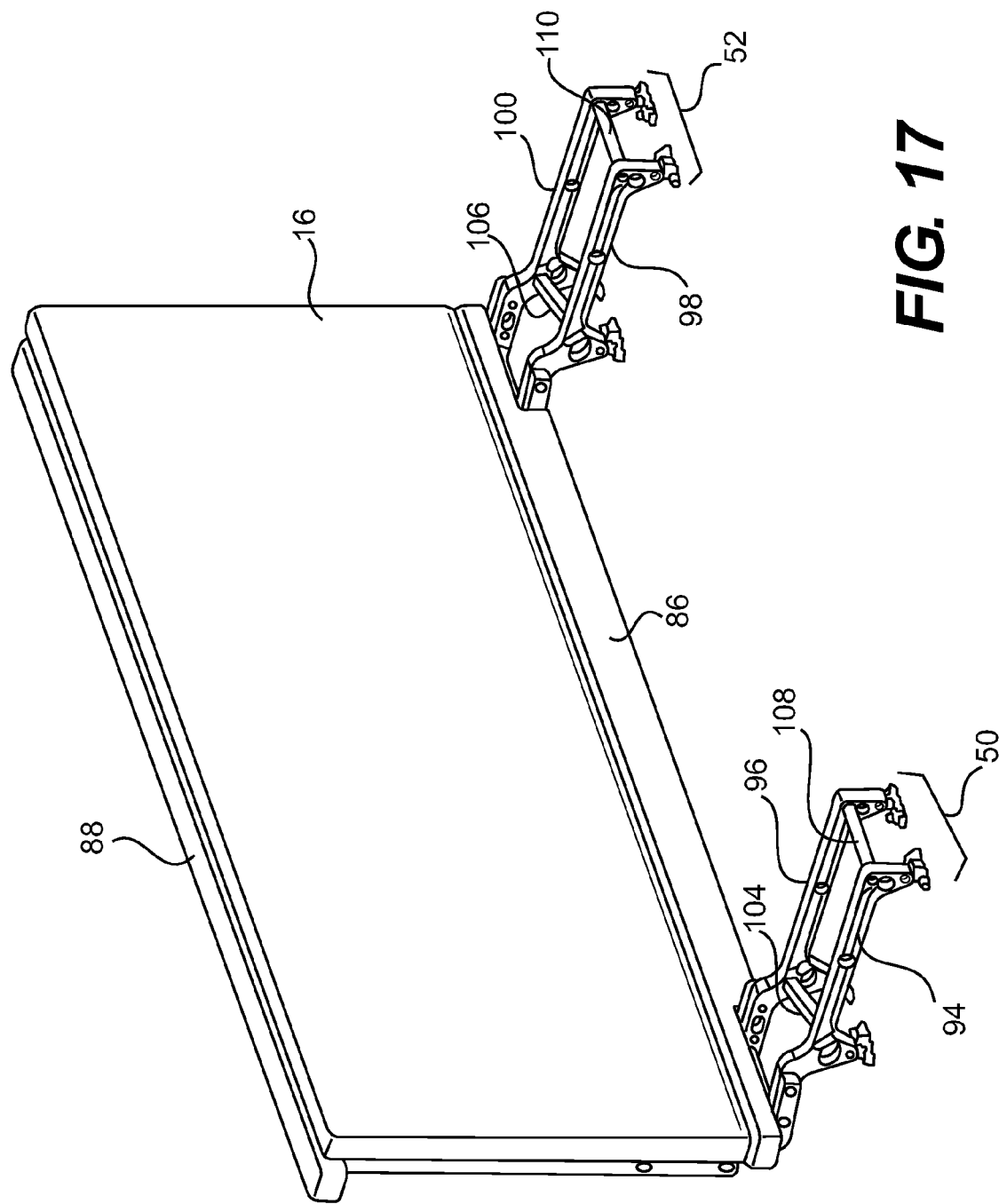
FIG. 17 is a perspective illustration of a portion of the seating arrangement, showing the top bunk in the stowed position with elements of the seat portion having been removed to better illustrate aspects of the present invention.

FIG. 17 is a perspective illustration of the vertical supports 50, 52, the top bunk 16, and the upper and lower side cushions 86, 88. As shown, the upper bunk 16 is shown in the stowed position.

Figure 18:
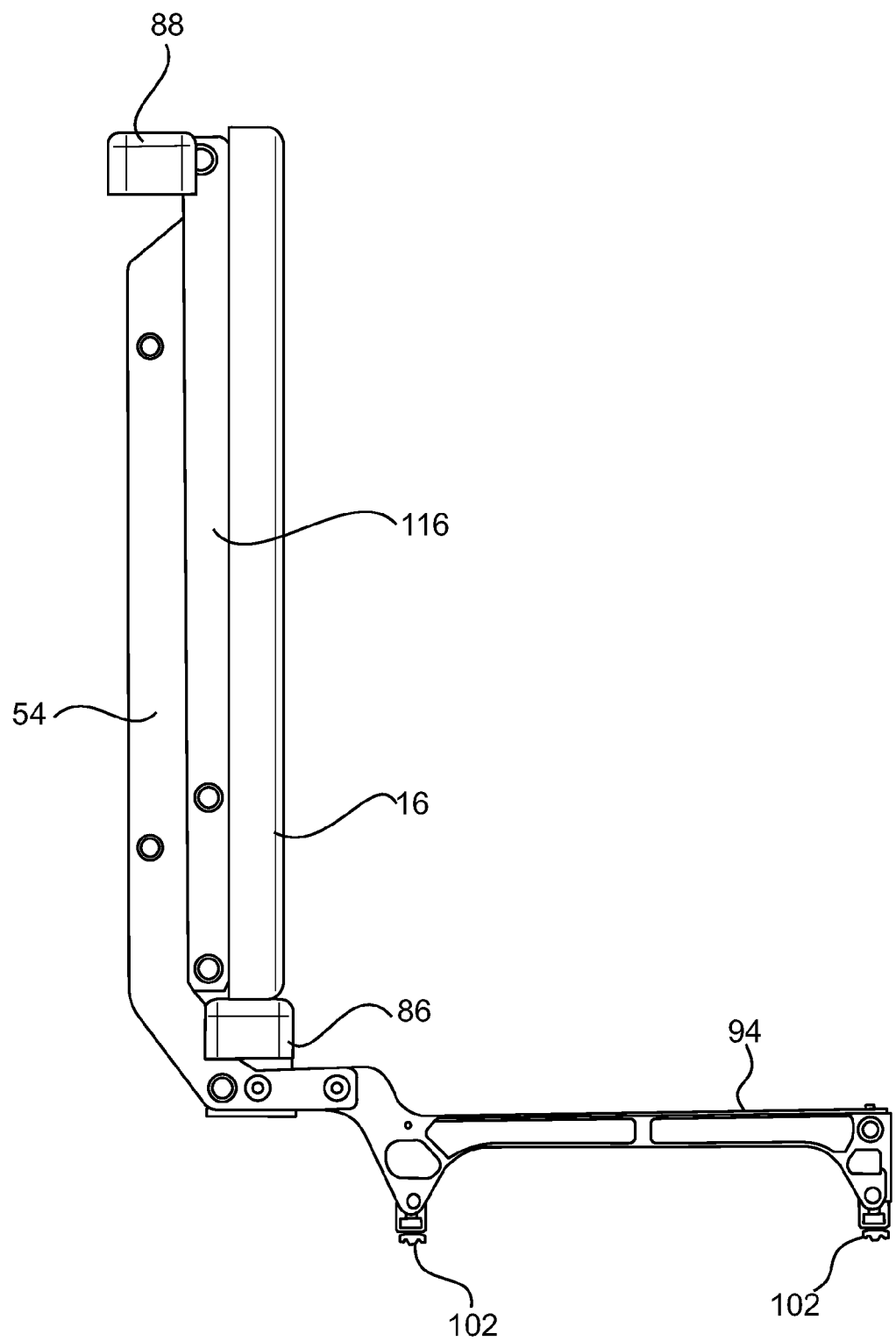
FIG. 18 is an end view of the portion of the seating arrangement illustrated in FIG. 17, with the top bunk being shown in the stowed position.

FIG. 18 is an end view (or a side view) of the portion of the seating arrangement 10 that is illustrated in FIG. 17. In this end view, one of the supports 116 that support the top bunk 16 is visible.

Figure 19:
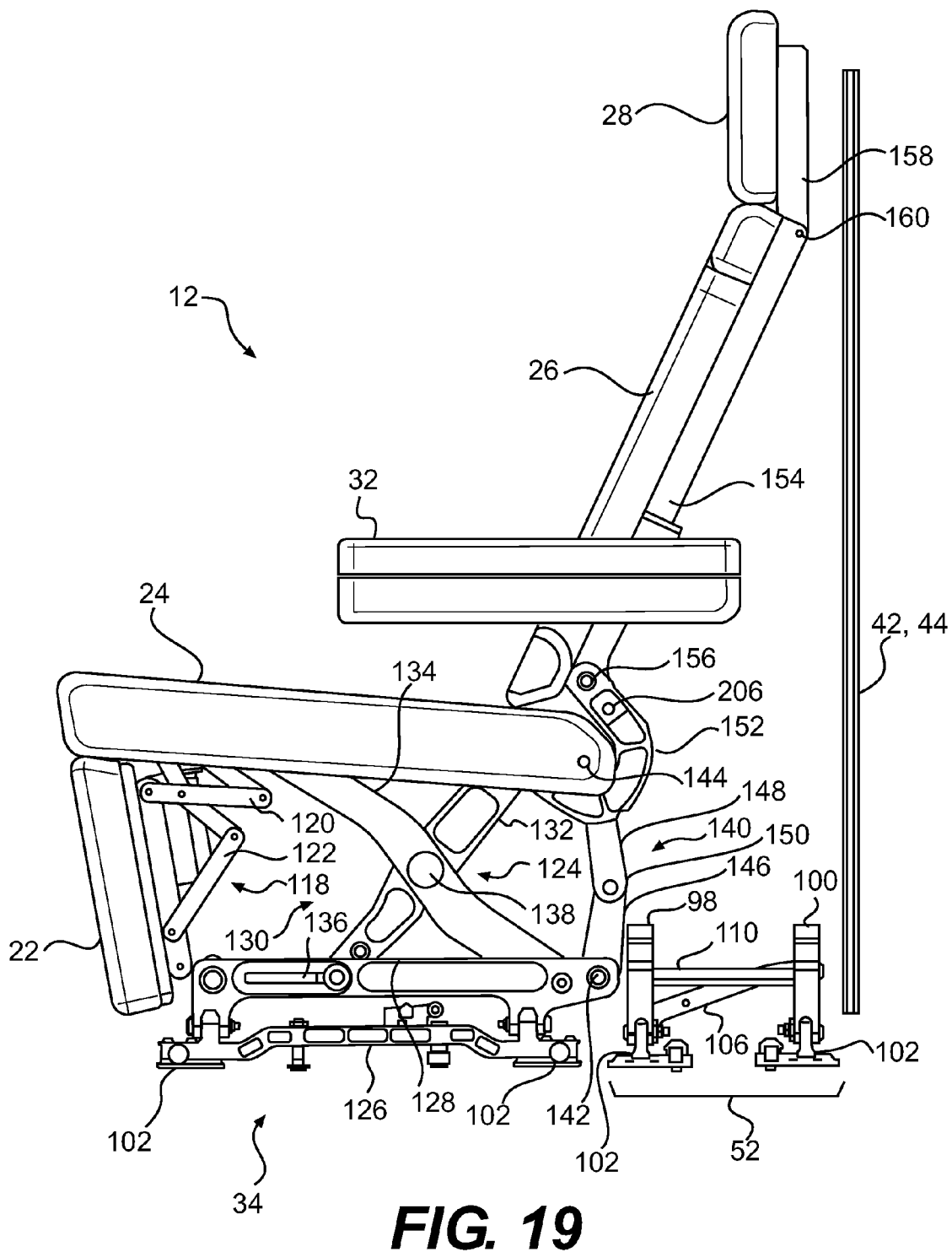
FIG. 19 is a side view of the seat portion of the seating arrangement of the present invention, providing an enlarged detail of the seat portion.

FIG. 19 is a side view of the seat 12 portion of the seating arrangement 10 of the present invention. In this view, the support is shown between the seat 12 and the seat rails 42, 44. As noted previously, the seat frame 34 is contemplated to slide within the tracks 20 within the floor of the aircraft's cabin, thereby permitting the seat 12 to transition from the seating orientation to the bunk bed orientation. The seat frame 34 is separate from the support frame 52, as discussed above.

Connecting the seat cushion 24 to the leg rest 22 is a leg rest frame 118. The exact construction and operation of the leg rest frame 118 is not critical to the operation of the seating arrangement 10 of the present invention. As should be apparent, the leg rest frame 118 permits the leg rest 22 to articulate from a generally vertical orientation, as illustrated in FIG. 19 to a horizontal orientation, such as when the leg rest 22 forms a part of the lower bunk 112. The leg rest frame 118 is considered to be part of the seat frame 34.

As shown in FIG. 19, the leg rest frame includes first and second articulated members 120, 122. The first articulated member 120 extends from a position beneath the seat cushion 24 and connects to a position adjacent to the top end of the leg rest 22. The second articulated member 122 also connects to a position beneath the seat cushion 24. However, the second articulated member 122 extends to a position adjacent to the bottom end of the leg rest 22. Together, the first and second articulated members 120, 122 help the leg rest 22 to transition from the essentially vertical orientation shown in FIG. 19 to a position where the leg rest forms a part of the lower bunk 112.

With continued reference to FIG. 19, the seat cushion 24 is supported by a seat cushion frame 124. The seat cushion frame 124 includes a lower structural element 126 and an upper structural element 128. The upper and lower structural elements 126, 128 connect between the feet 102 that connect the seat 12 to the tracks 20 in the floor of the cabin of the aircraft.

The seat cushion 24 is contemplated to be disposed on an underframe (not shown) that connects, via a scissor element 130 to the upper structural element 128. The scissor element 130 includes first and second scissor elements 132, 134.

The first scissor element 132 connects, at its upper end, to a position under the seat cushion 24, at a location near to the rear of the seat cushion 24. It is understood that this connection is a pivotal connection. The lower end of the first scissor element 132 connects to the upper structural element 128 near to a front end thereof. As shown, the lower end of the first scissor element 132 connects to the upper structural element 128 in both a pivotal and a sliding manner. A slot 136 is provided in the upper structural element 128 to permit the lower end of the first scissor element 132 to slide with respect to the upper structural element 128.

The second scissor element 134 also connects between the subframe under the seat cushion 24 and the upper structural element 128. Specifically, the second scissor element 134 connects, at its top end, at a position beneath the seat cushion near to the front end of the seat cushion 24. This connection is understood to be both a pivotal and a sliding connection. The bottom end of the second scissor element is connected pivotally to the upper frame element 128 at a position adjacent to the rear end thereof.

The first and second scissor elements 132, 134 are connected pivotally to one another at a midpoint, via a pivot 138. As should be apparent to those skilled in the art, cooperation between the first and second scissor elements 132, 134 (together with other frame elements) permits the seat cushion to transition between the first and second heights 78, 80 (as shown in FIG. 2).

A rear frame element 140 also extends between a pivot point 142 at the rear of the upper frame element 128 and a pivot 144 near to the rear of the seat cushion 24. The rear frame element 140 is understood to transfer a load resulting from a forward dynamic event from the seat belt anchor element 206, among other aspects of the seat 12 of the present invention. The rear frame element 140 includes a lower element 146 and an upper element 148 that are connected to one another via a pivot 150.

The frame underlying the seat cushion 24 is connected to a back rest connector element 152. The back rest connector element 152 is a C-shaped member (also referred to as a gooseneck) that connects to the back rest frame 154 at pivot point 156 and to the seat cushion 24 at the pivot point 144.

The back rest frame 154 connects to a head rest frame 158 at a pivot point 160.

As should be apparent from FIG. 19, each of the frame elements is contemplated to have a corresponding frame element adjacent to the other side of the seat 12. The corresponding frame elements are visible in FIG. 20, among other figures.

Figure 20:
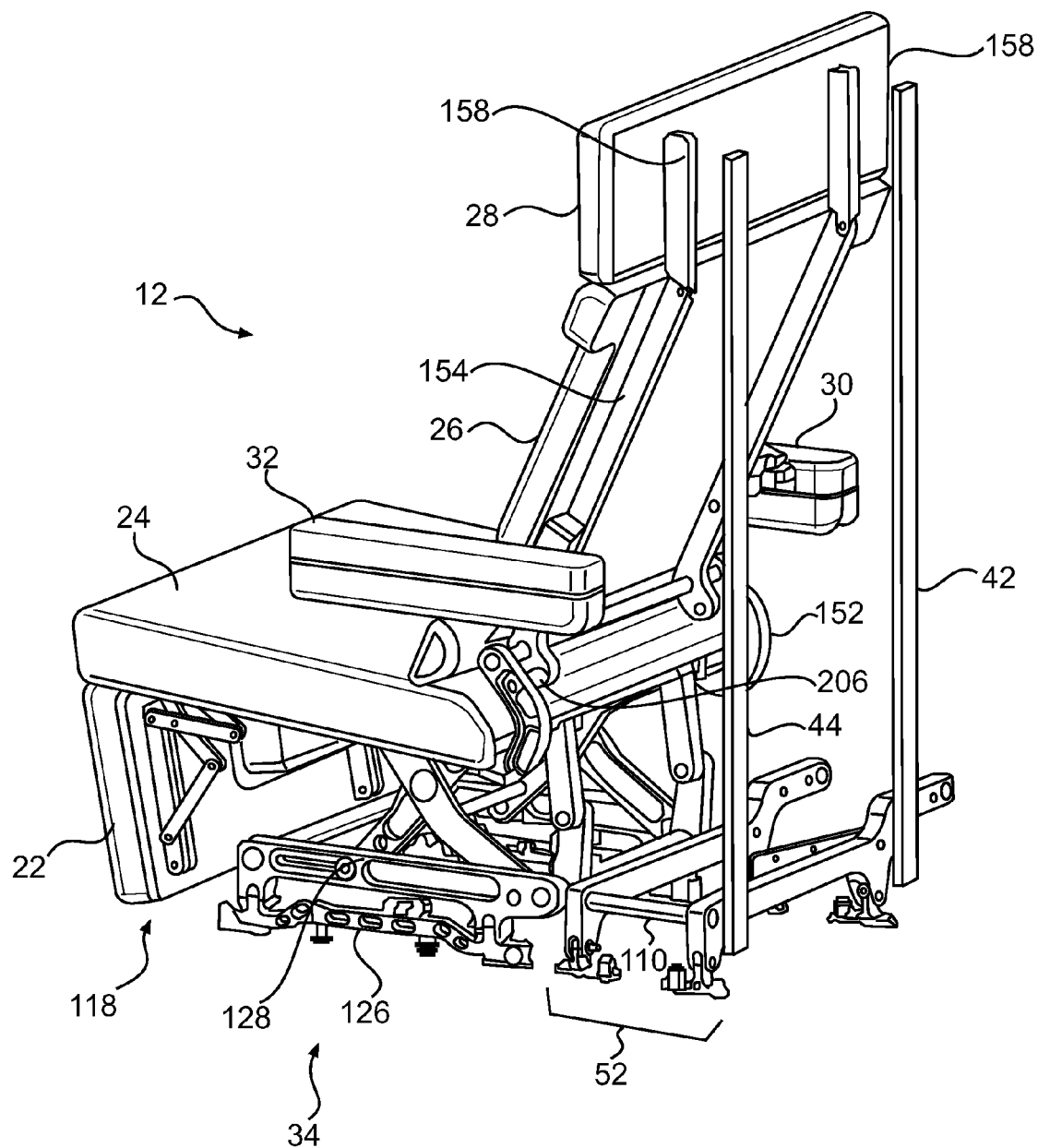
FIG. 20 is a rear, perspective illustration of the seat portion of the seating arrangement of the present invention shown in FIG. 19.

FIG. 20 is a perspective illustration of the seat 12 portion of the seating arrangement 10 of the present invention. The relative positions of various parts of the seating arrangement 10 are shown in this illustration.

Figure 21:
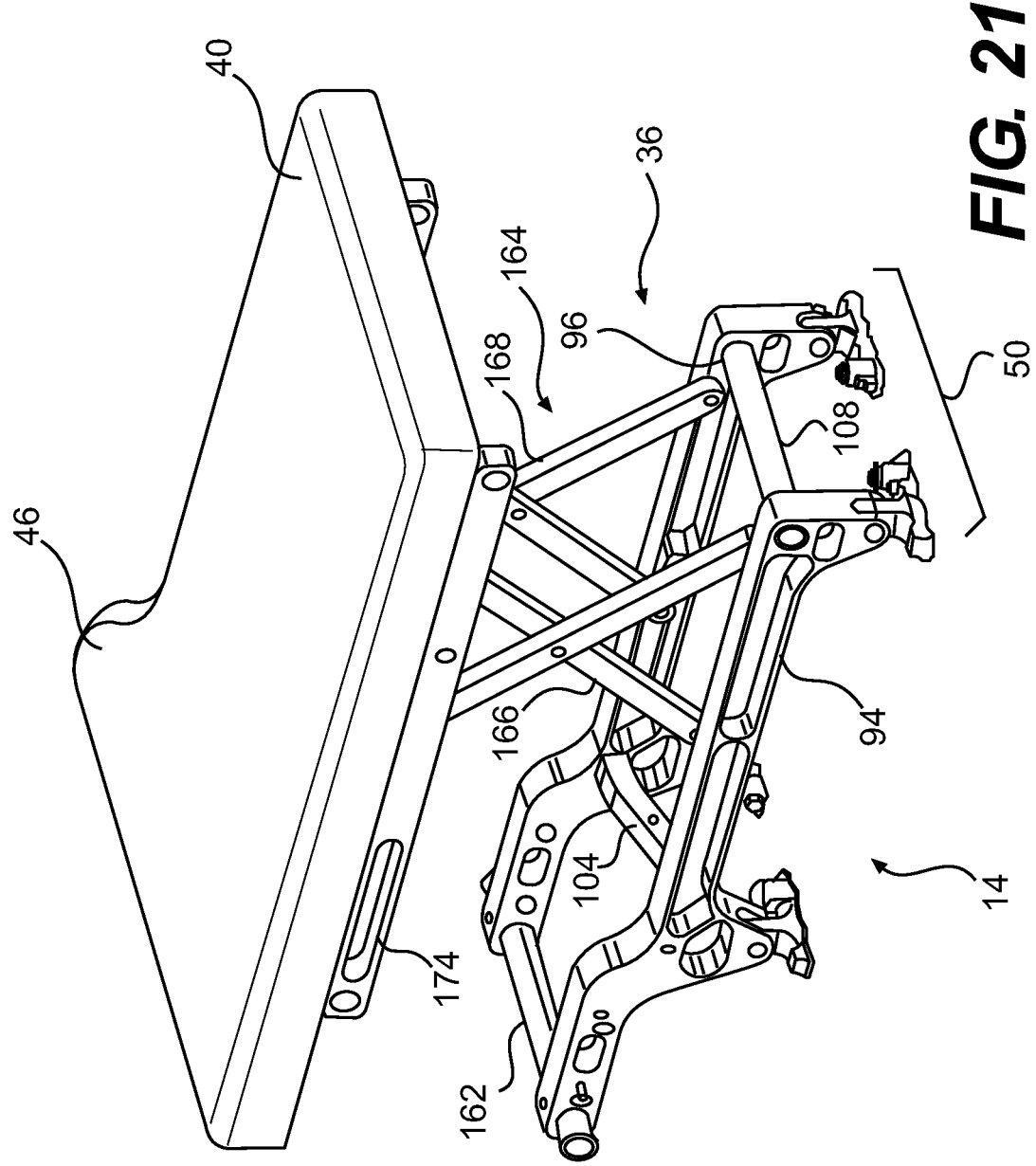
FIG. 21 is a perspective illustration of the ottoman portion of the seating arrangement of the present invention.

FIG. 21 is a perspective illustration of the ottoman 14 that forms a part of the seating arrangement of the present invention. The ottoman 14 includes an ottoman cushion 40 that is supported on an ottoman frame 36. The ottoman frame 36 includes the bottom portion of the support frame 50. As discussed above, this includes the horizontal elements 94, 96, the horizontal connector 108, and the diagonal connector 104. As illustrated, the horizontal elements 94, 96 include a further horizontal connector 162.

In addition, the ottoman frame 36 includes a scissor element 164 that combines a first scissor element 166 and a second scissor element 168.

The first scissor element 166 connects to the horizontal elements 94, 96 adjacent to a rear end thereof. Specifically, the bottom end of the first scissor element 166 connects to a side of the horizontal frame elements 94, 96 that is near to the fuselage wall of the aircraft. The bottom end of the first scissor element 166 is contemplated to connect to the horizontal elements 94, 96 via a pivotal and a sliding engagement. The top end of the first scissor element 166 pivotally engages a frame element 170 beneath the ottoman cushion 40 at a pivot point 172.

The second scissor element 168 connects to a slot 174 in the frame element 170 via an end sleeve 176 (defining a pivot). As a result, the top end of the second scissor element 168 pivotally and slidingly engages the frame element 170. The bottom end of the second scissor element 168 pivotally connects to the frame elements 94, 96 via a pivot 178. The first and second scissor elements 166, 168 pivotally connect to one another via a pivot 180.

Figure 22:
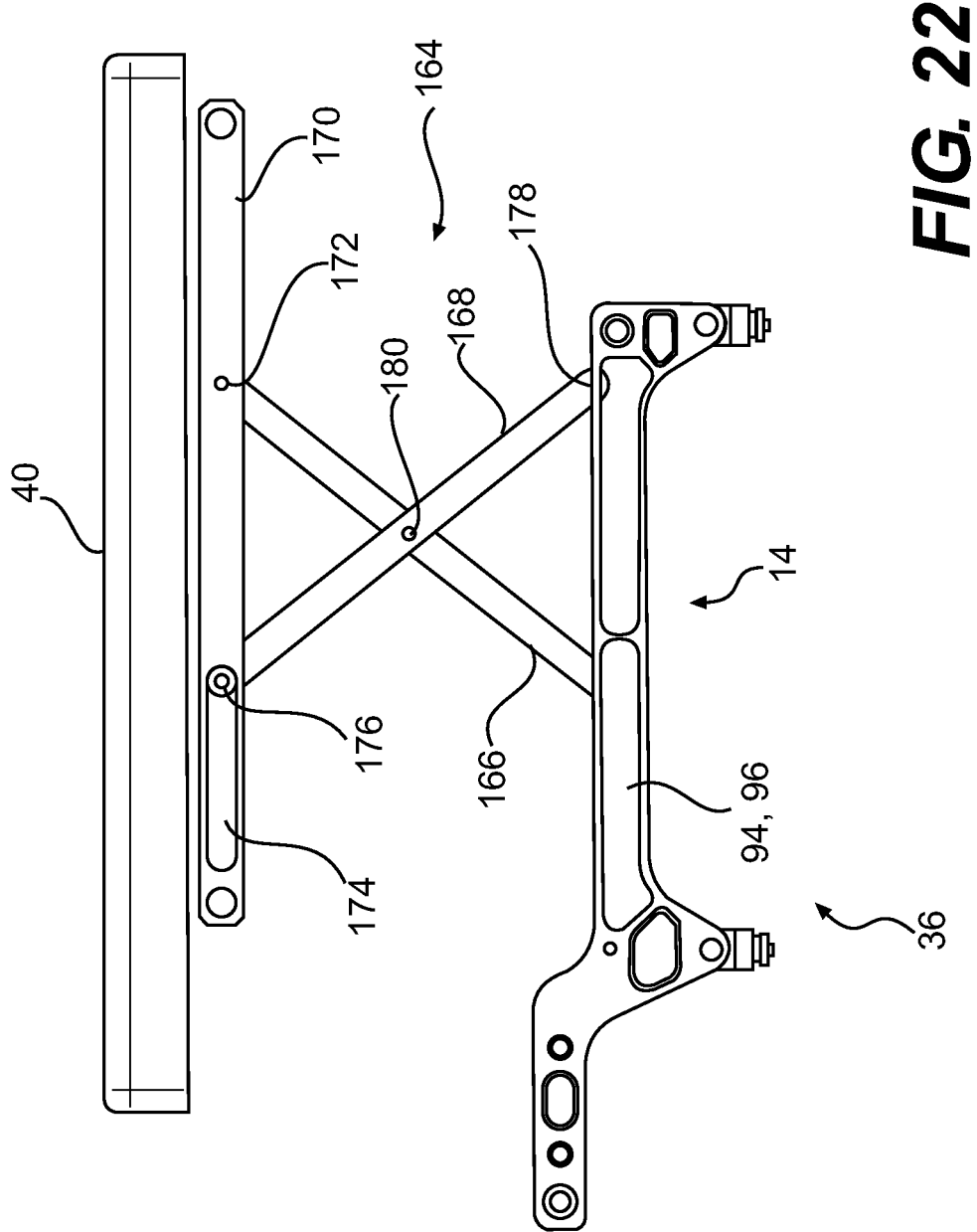
FIG. 22 is an end view illustration of the ottoman portion of the seating arrangement shown in FIG. 21.

As should be apparent from FIG. 22 and the discussion of the seating arrangement 10 presented above, the scissor element 164 supporting the ottoman cushion 40 permits the ottoman cushion 40 to transition between a first height 72 and a second height 74. As a result, the ottoman cushion 40 may transition from a seating position, in which the ottoman 14 is at the first height 72, to a bunk bed position, in which the ottoman 14 is at the second height 74, lower than the first height.

As noted above, the operation of the seat 12, the ottoman 14, and the top bunk 16 is contemplated to be entirely manual. In other words, it is anticipated that the seat 12, ottoman 14, and top bunk 16 are manipulated by a person, such as a crew member or flight attendant, between the seating position and the bunk bed position.

While a manual operation is contemplated for the seating arrangement 10 of the present invention, the seating arrangement 10 may include electrical, electro-mechanical, or pneumatic operator(s). For example, motors may be used to automatically transition the seating arrangement 10 from the seating orientation to the bunk bed orientation. As should be apparent, the exact mode of operation of the seating arrangement 10 of the present invention is not critical to the present invention.

Figure 23:
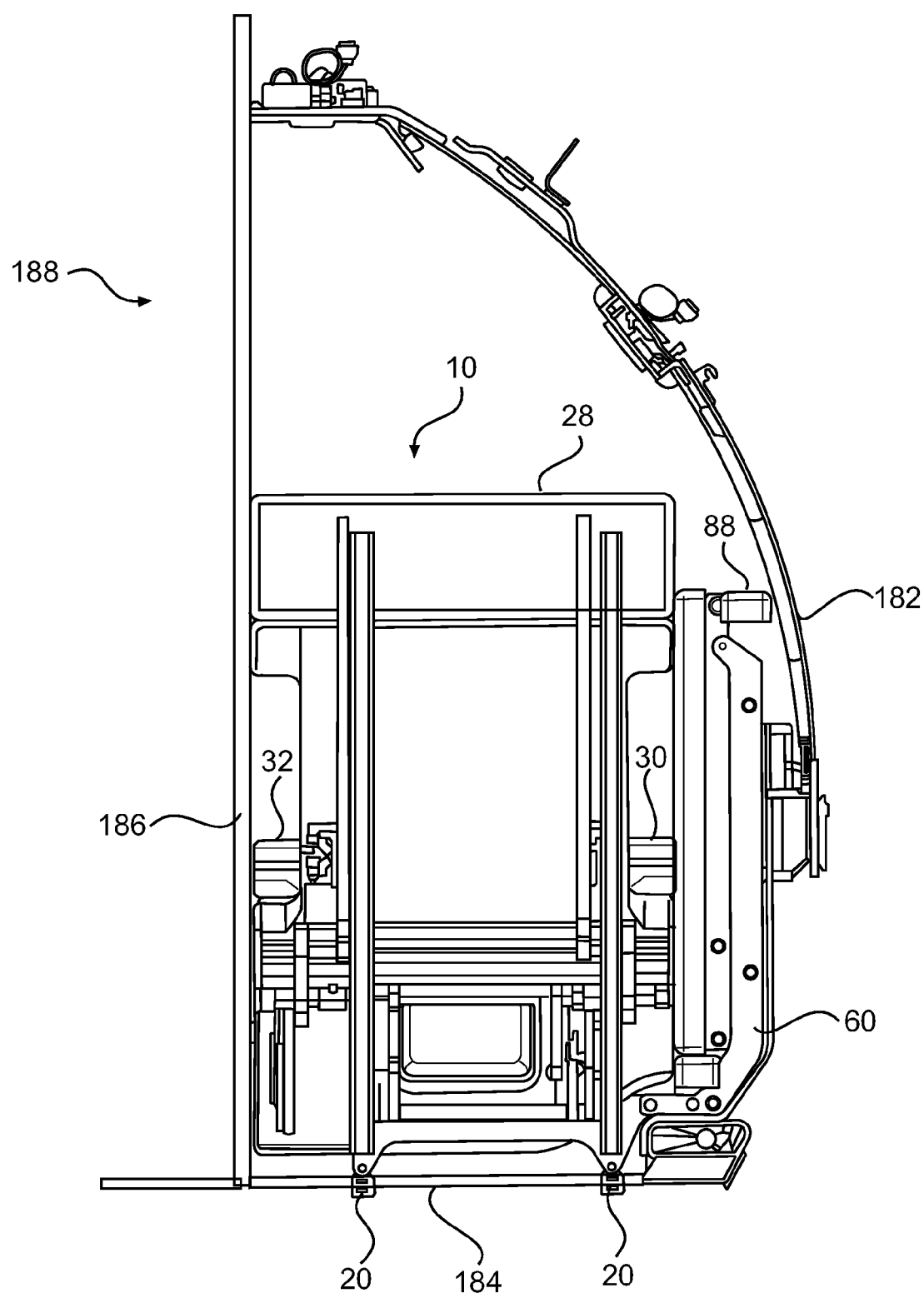
FIG. 23 is an end view of the seating arrangement of the present invention, shown in one contemplated position within the interior of an aircraft, with the seat portion being shown in the seating configuration.

FIG. 23 is an end view of the seating arrangement 10 of the present invention, showing the position of the seating arrangement 10 at one contemplated location within an aircraft. For reference, the side wall 182 of the aircraft is shown. The floor 184 of the cabin also is shown.

FIG. 23 also depicts an additional aspect of the seating arrangement 10 of the present invention. Specifically, FIG. 23 illustrates a partition 186 (or wall) that is disposed adjacent to the seating arrangement 10. As discussed in connection with the remaining figures of the drawings, the partition 186 establishes a privacy compartment 188 around the seating arrangement 10 of the present invention.

FIG. 23 shows the seating arrangement 10 in the seating configuration, as should be apparent to those skilled in the art.

Figure 24:
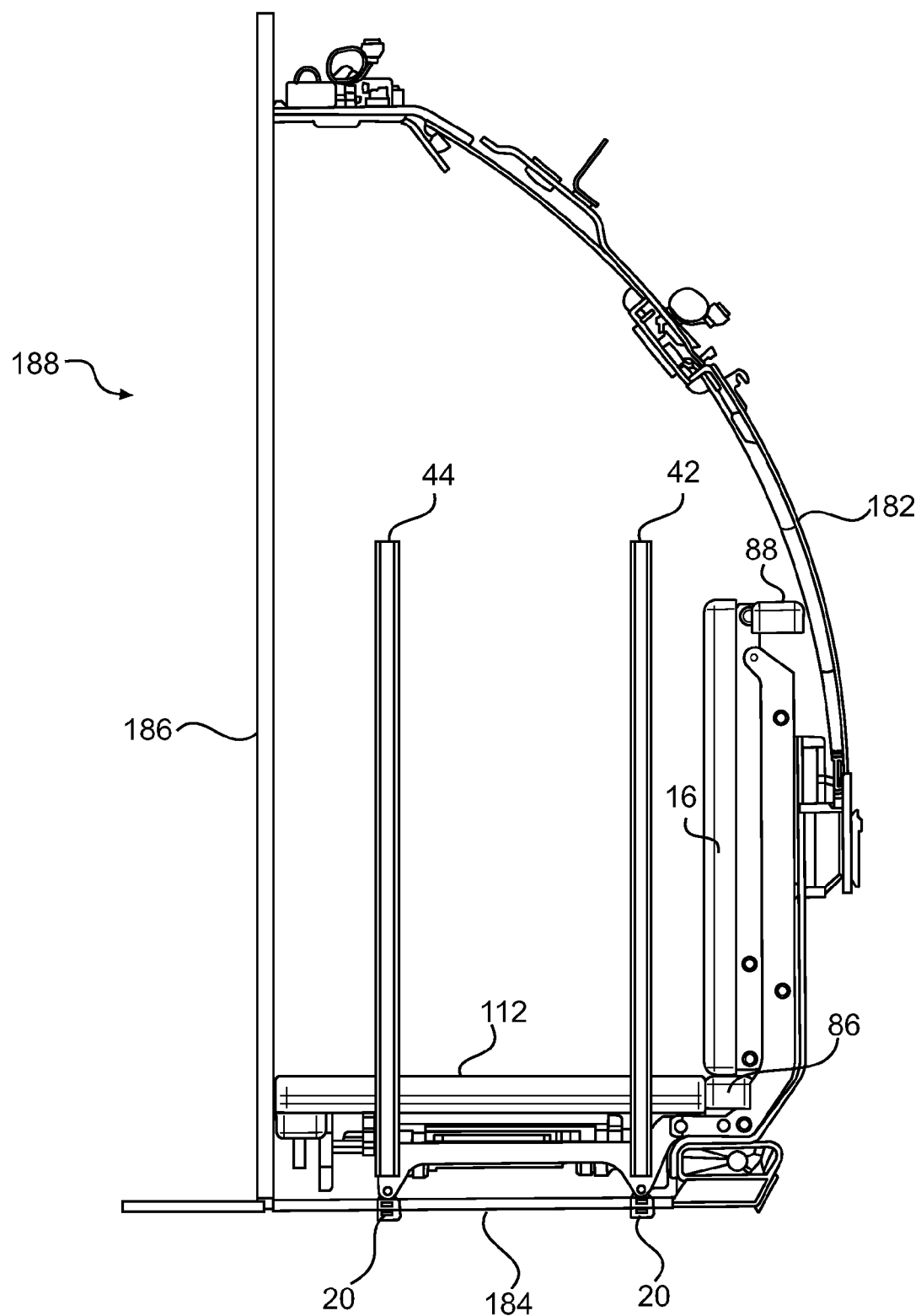
FIG. 24 is an end view of the seating arrangement of the present invention, with the seat being shown in the position where the seat forms the lower bunk bed.

FIG. 24 also is an end view of the seating arrangement 10 of the present invention, as disposed within the aircraft privacy compartment 188. In this view, the seat 12 has been reconfigured to form the lower bunk 112. However, the top bunk 16 is still in the vertical (or stowed) position.

Figure 25:
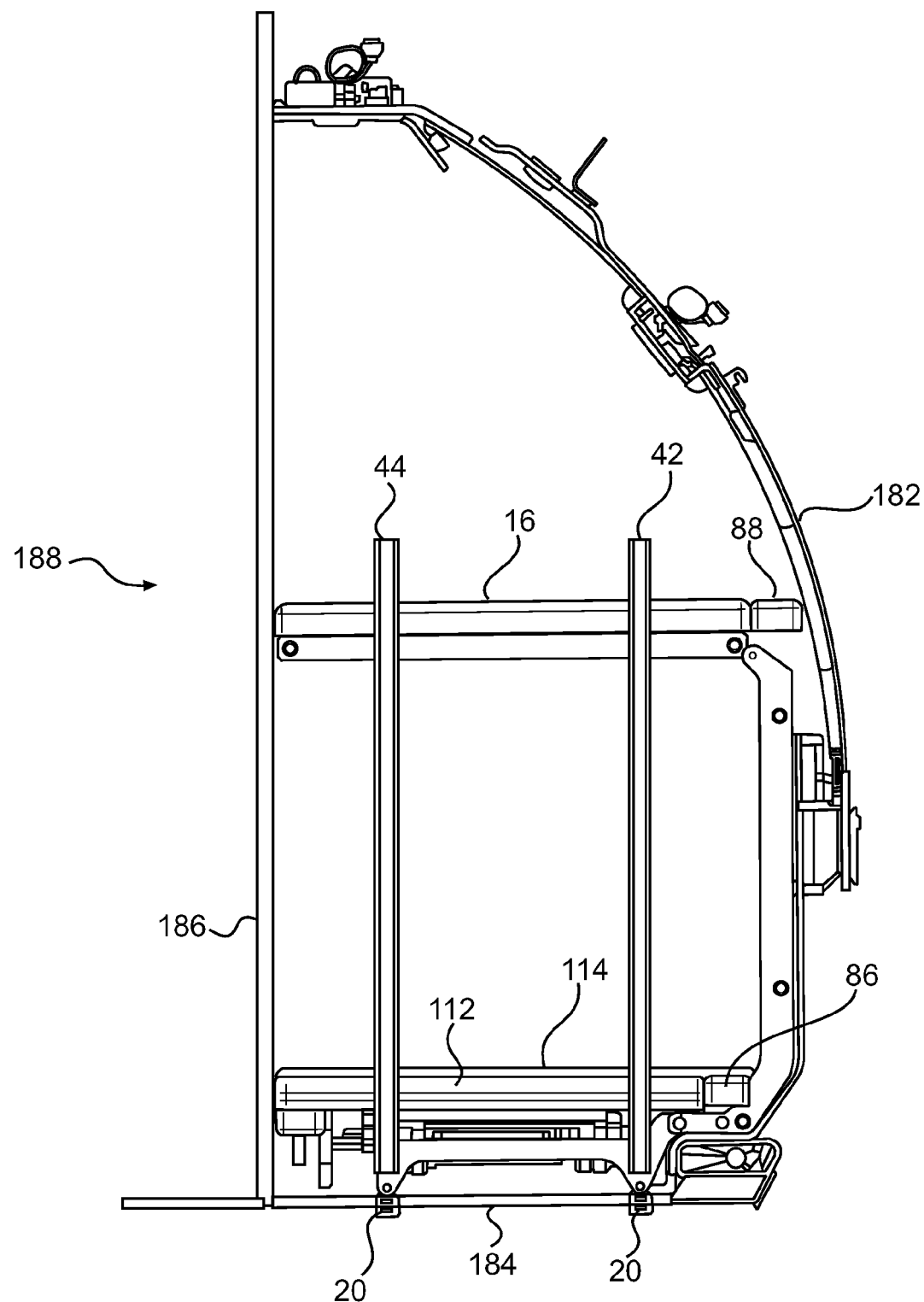
FIG. 25 is an end view of the seating arrangement of the present invention, showing the upper and lower bunk beds in the bunk bed configuration.

FIG. 25 is the same end view of the seating arrangement 10 of the present invention. In this view, the top bunk 16 has been rotated from the vertical position (the stowed position) to the horizontal position to establish the sleeping area of the top bunk. The mattress pad 114 also is shown in this figure.

Figure 26:
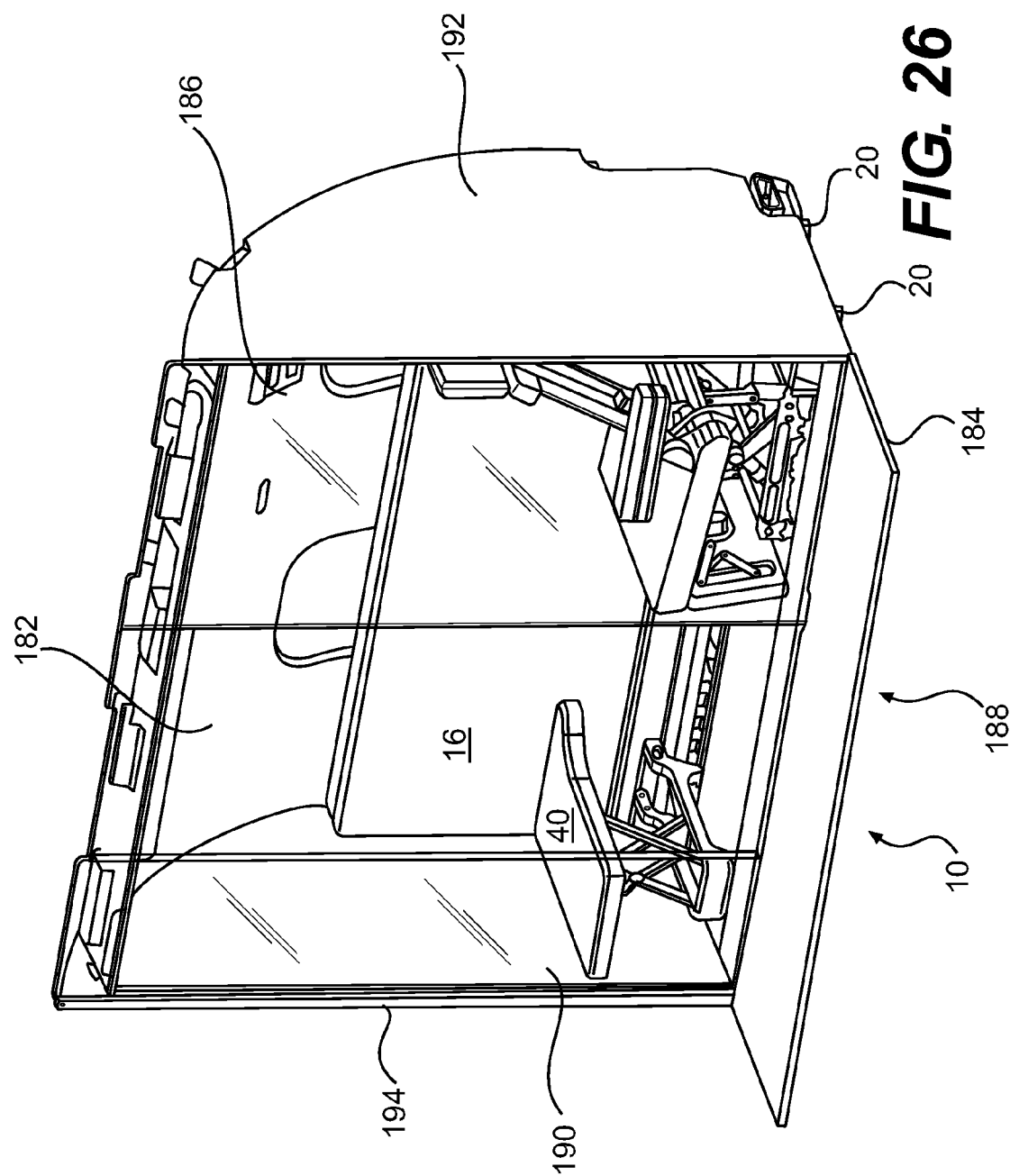
FIG. 26 is a perspective illustration of the seating arrangement of the present invention, which is enclosed within a contemplated privacy compartment, with the seat being illustrated in the upright position.

FIG. 26 is a perspective illustration of the seating arrangement 10 of the present invention in the aircraft privacy compartment 188. The seating arrangement 10 is in the seating configuration that might be selected for TTL. The privacy compartment 188 also includes a partition 190 that is adjacent to the ottoman 14. In addition, bulkheads 192, 194 are provided at either end of the privacy compartment 188.

Figure 27:
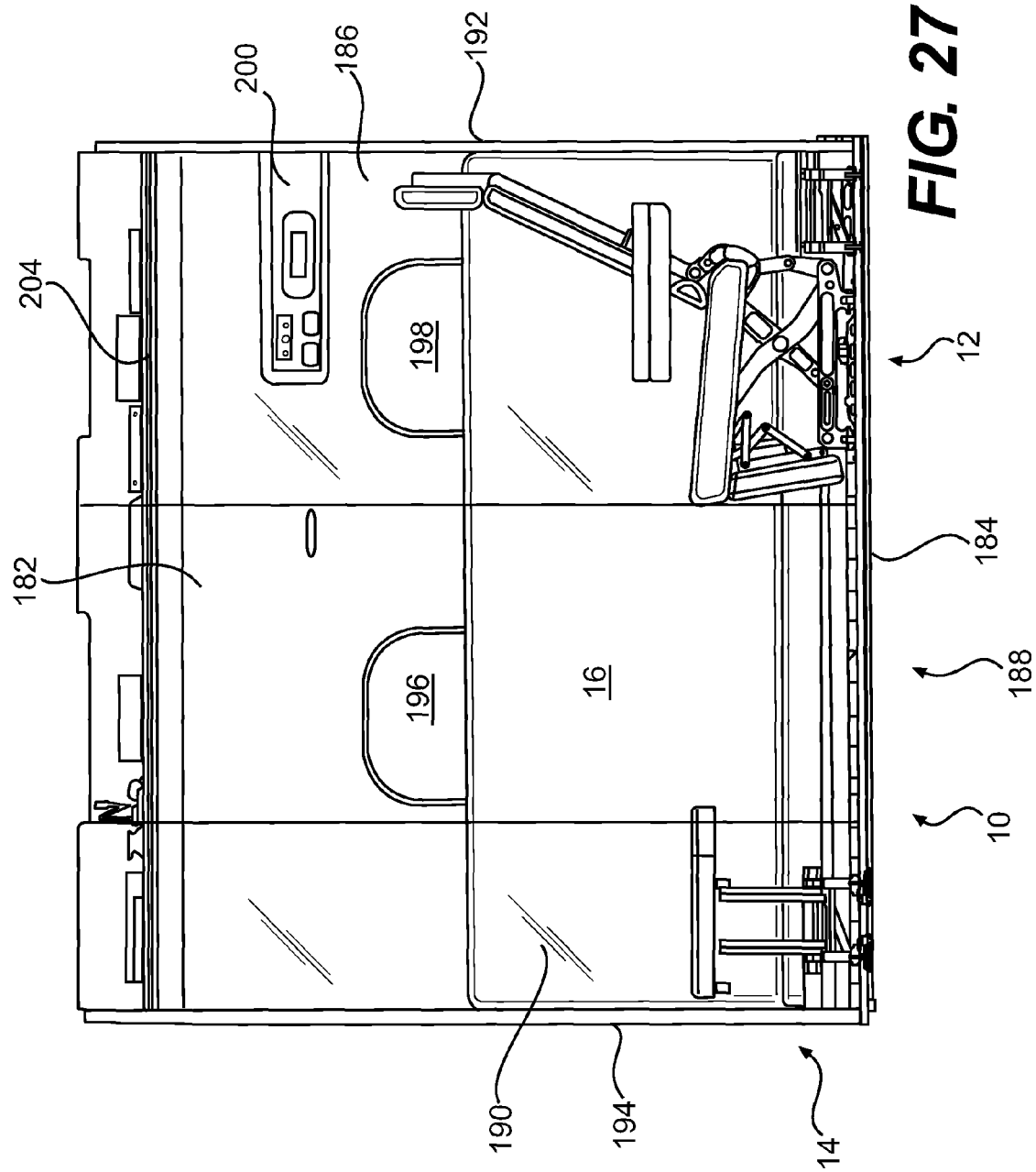
FIG. 27 is a side view of the seating arrangement, which is shown in FIG. 26.

FIG. 27 is a front view of the seating arrangement 10 positioned within the privacy compartment 188. As in FIG. 26, the seating arrangement 10 is in a TTL (or seating) position. Two windows 196, 198 are visible in this view. In addition, convenience groups 200 and 204 also are visible. The convenience groups 200, 204 include, for example, reading lights, air vents, and emergency oxygen masks.

Figure 28:
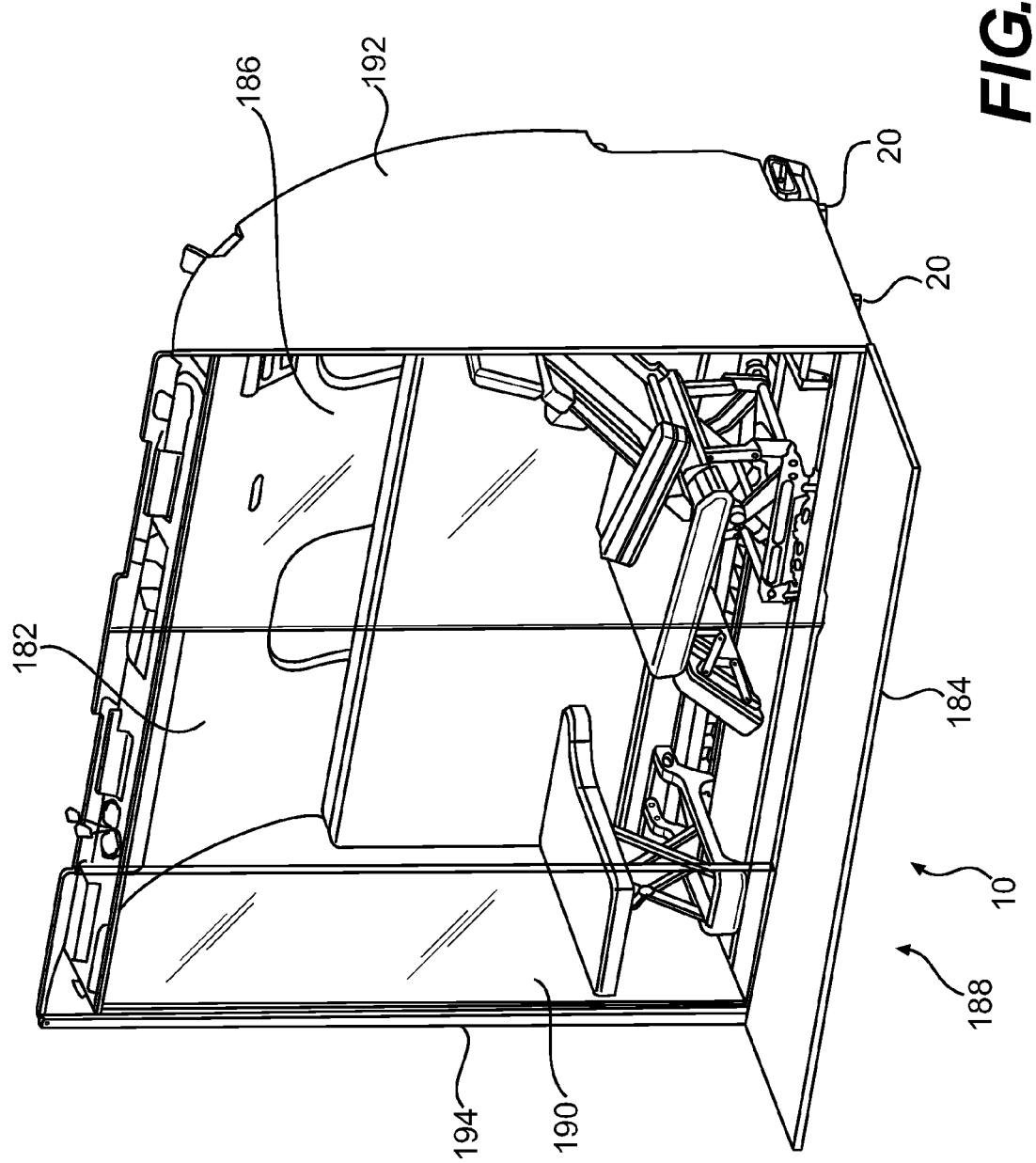
FIG. 28 is a perspective illustration of the seating arrangement of the present invention, showing the seat in a partially reclined position.

FIG. 28 is a perspective illustration of the seating arrangement 10 in the privacy compartment 188. The seat 12 is shown in a partially reclined position.

Figure 29:
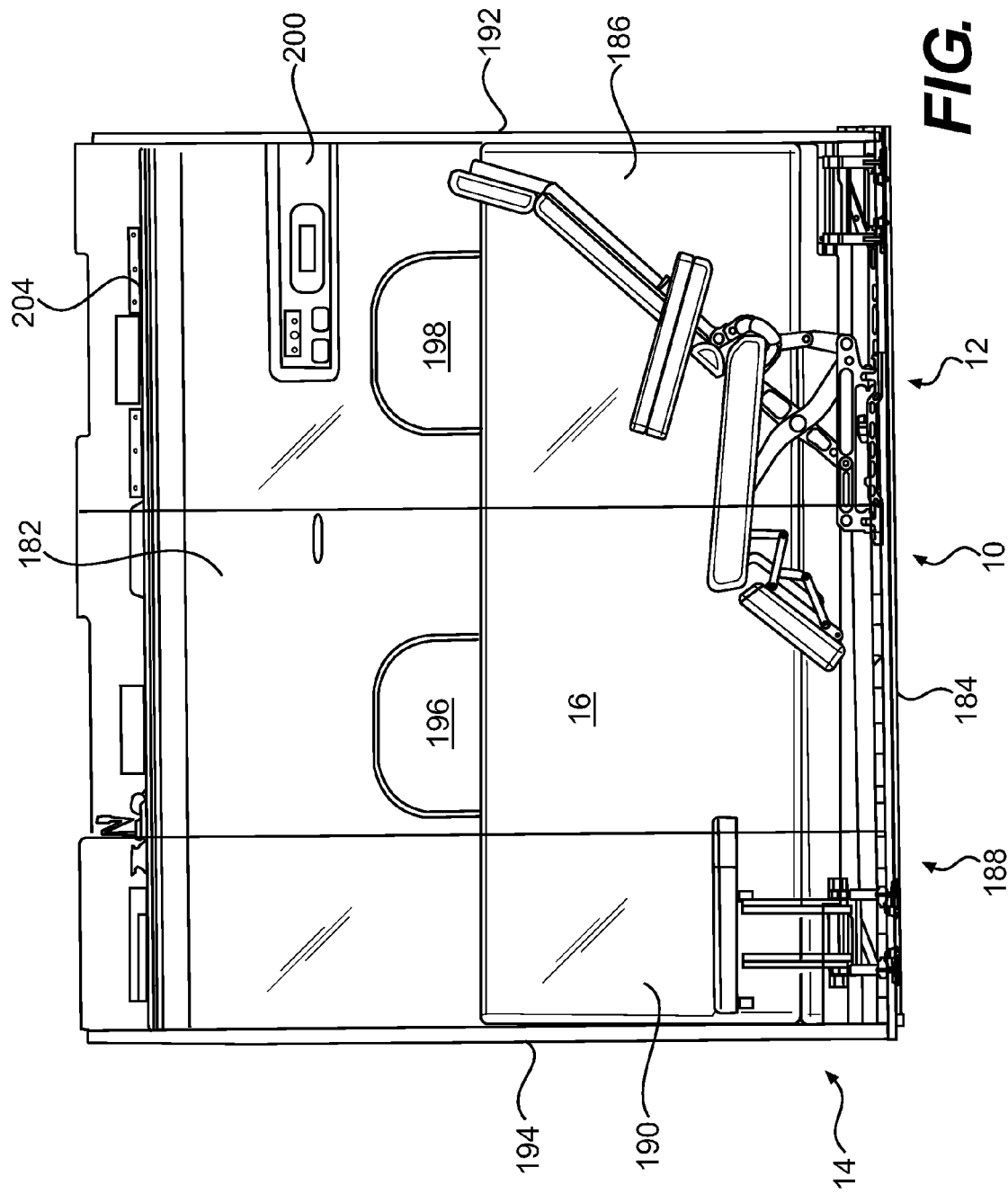
FIG. 29 is a side view of the seating arrangement illustrated in FIG. 28.

FIG. 29 is a front view of the seating arrangement illustrated in FIG. 28. As in FIG. 28, the seat 12 is in a partially reclined position.

Figure 30:
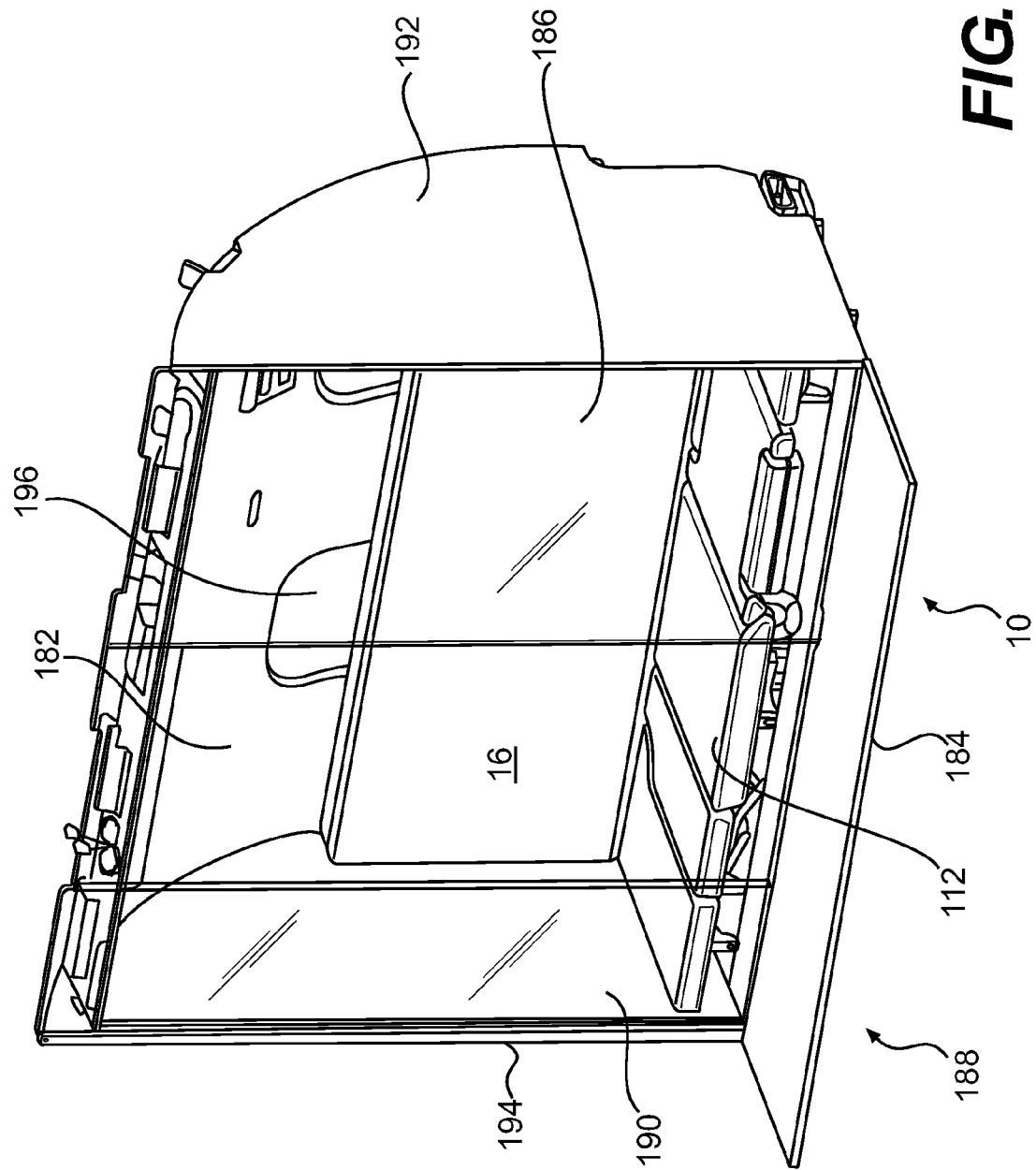
FIG. 30 is a perspective illustration of the seating arrangement of the present invention, showing the seat in the lower bunk bed configuration.

FIG. 30 is a perspective illustration of the seating arrangement 10 of the present invention. The seat 12 and the ottoman 14 have been transitioned to the second configuration where the lower bunk 112 has been established. The top bunk 16 is shown in the stowed position.

Figure 31:
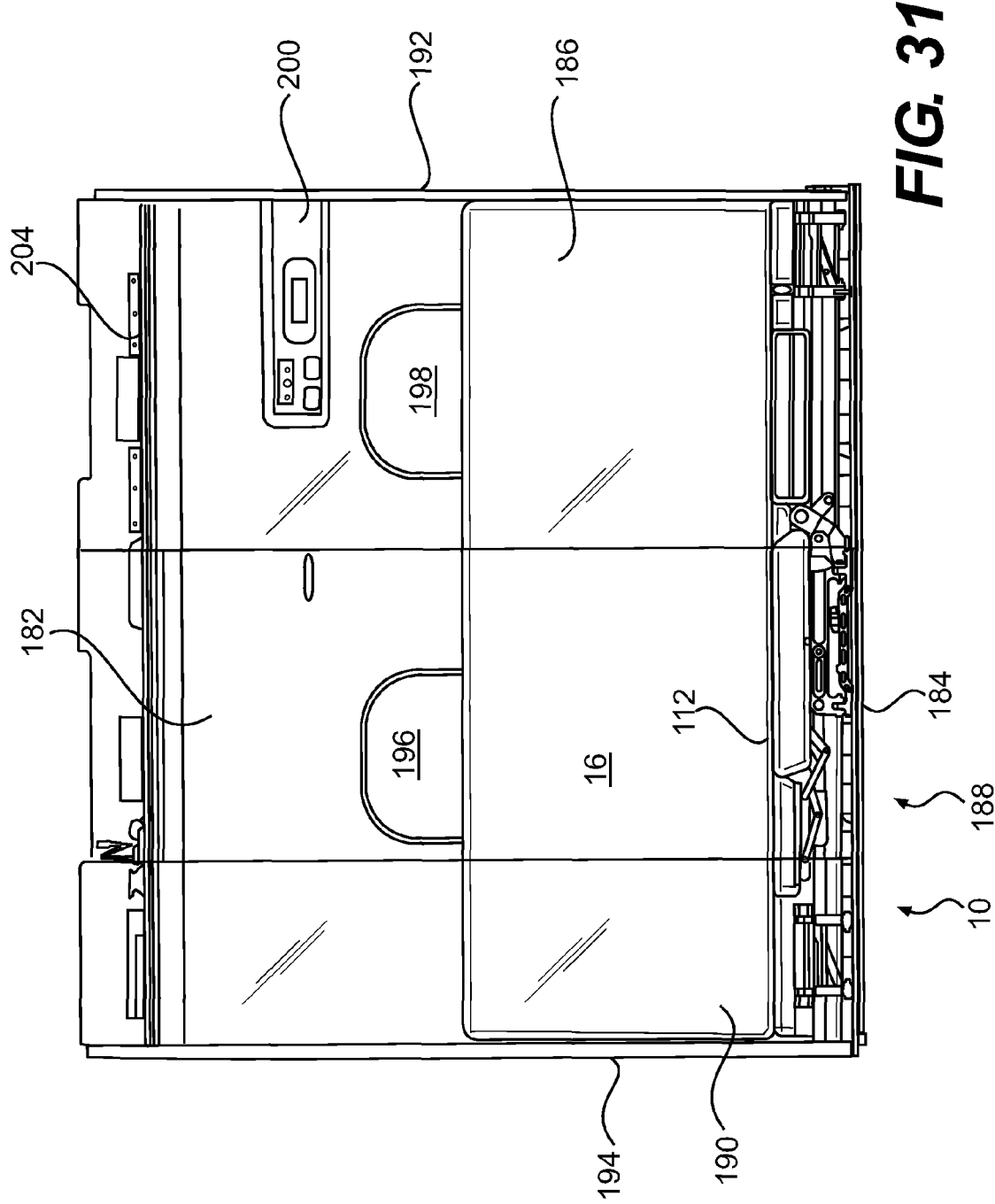
FIG. 31 is a side view of the seating arrangement of the present invention consistent with the orientation illustrated in FIG. 30.

FIG. 31 is a front view of the seating arrangement shown in FIG. 30. As indicated, the lower bunk 112 has been established, but the top bunk 16 remains in the stowed position.

Figure 32:
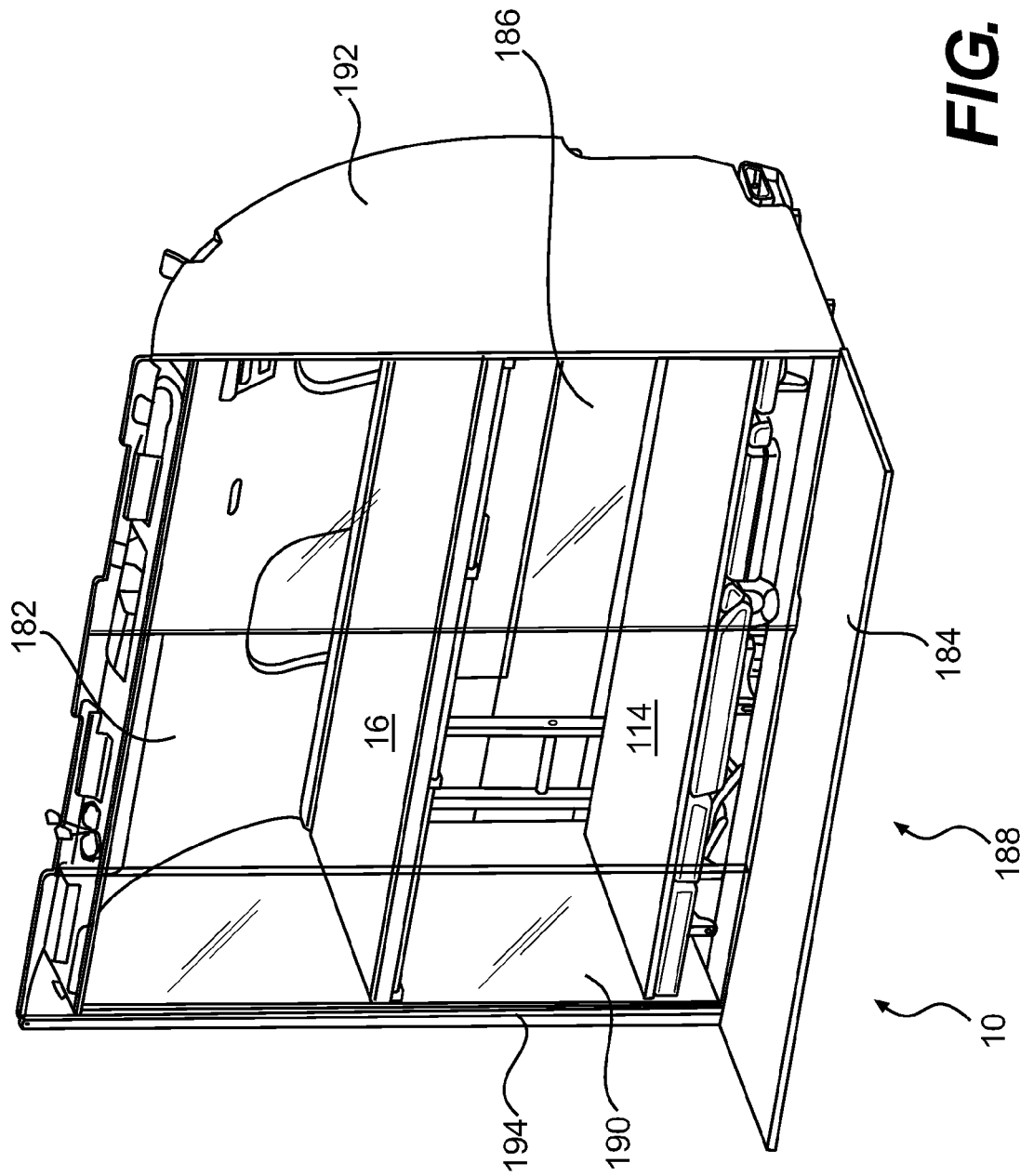
FIG. 32 is a perspective illustration of the seating arrangement of the present invention, showing the bunk bed in the fully deployed condition.

FIG. 32 is a perspective illustration of the seating arrangement 10 in the privacy compartment 188. In this view, the top bunk 16 has been established. In addition, the mattress pad 114 has been positioned on the lower bunk 112.

Figure 33:
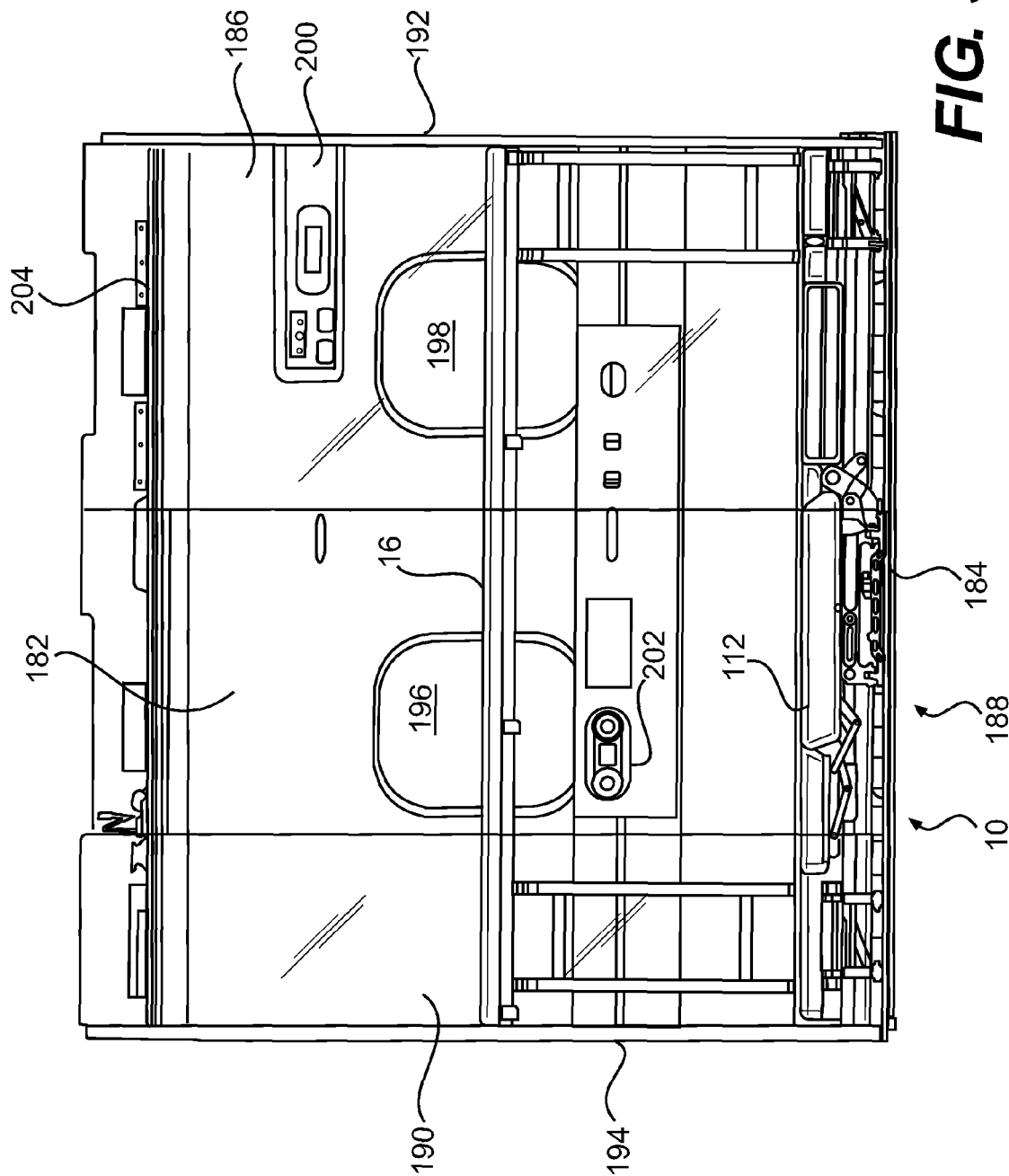
FIG. 33 is a side view of the seating arrangement that this illustrated in FIG. 32.

FIG. 33 is front view of the seating arrangement 10 shown in FIG. 32. In this view, a convenience group 202 is visible over the lower bunk 112.

As noted above, the present invention is not intended to be limited to any one of the embodiments described herein. To the contrary, the enumerated embodiments are intended to be exemplary of the scope of the present invention. In addition, it is noted that features from one embodiment of the present invention may be incorporated into other embodiments, interchangeably, without departing from the scope of the present invention.

What is claimed is:

1. A seating arrangement, comprising:
   a seat including a seating surface and a back rest with a bottom end and a top end, the bottom end being connected to and moveable in relation to a rear end of the seating surface; and
   a top bunk,
   wherein the seat and the top bunk are configurable between a first configuration and a second configuration,
   wherein, in the first configuration, the seat accommodates a user in a seated position and the top bunk is stowed adjacent to a side surface of the seat,
   wherein, in the second configuration, the seat and the top bunk form a bunk bed configured to accommodate users in prone positions,
   wherein, in the first configuration, the seating surface is disposed at a first predetermined height, and
   wherein, in the second configuration, the seating surface is disposed at a second predetermined height that is lower than the first predetermined height.

2. The seating arrangement of claim 1, wherein the seat further comprises:
   a leg rest connected to and moveable in relation to a front end of the seating surface;
   a head rest connected to and moveable in relation to the top end of the back rest.

3. The seating arrangement of claim 1, further comprising:
   armrests pivotally attached to respective sides of the back rest.

4. The seating arrangement of claim 3, wherein the back rest and armrests are configured such that the back rest and armrests form a contiguous surface when the armrests are folded adjacent to the back rest.

5. The seating arrangement of claim 3, wherein the back rest and the armrests are configured to form a contiguous surface, establishing part of a lower bunk, when the seat is in the second configuration.

6. The seating arrangement of claim 1, further comprising:
   at least two vertical supports extending upwardly adjacent to the seat, the two vertical supports being pivotally connected to the top bunk to permit the top bunk to pivot between the first and second configurations.

7. The seating arrangement of claim 1, wherein the seat and the top bunk are attachable to tracks in a floor supporting the seat and the top bunk.

8. The seating arrangement of claim 1, further comprising:
an ottoman disposed a predetermined distance from the seat,
wherein the ottoman includes an ottoman cushion,
wherein, in the first configuration, the ottoman cushion is disposed at the first predetermined height, and
wherein, in the second configuration, the ottoman cushion is disposed at the second predetermined height.

9. The seating arrangement of claim 8, wherein the seat further comprises:
a leg rest connected to and moveable in relation to a front end of the seating surface;
a head rest connected to and moveable in relation to the top end of the back rest.

10. The seating arrangement of claim 9, wherein, in the second configuration, the leg rest, back rest, head rest, and ottoman cushion together form a lower bunk beneath the top bunk.

11. The seating arrangement of claim 10, wherein the ottoman cushion and the leg rest include abutting, adjacent edges with shapes that complement one another.

12. The seating arrangement of claim 11, wherein the ottoman cushion includes a bulged section and the leg rest includes an indentation along the abutting, adjacent edges that complement one another.

13. The seating arrangement of claim 8, wherein the ottoman further comprises:
an ottoman frame supporting the ottoman cushion, the ottoman frame including an ottoman frame scissor element permitting the ottoman cushion to transition between the first predetermined height and the second predetermined height.

14. The seating arrangement of claim 13, wherein the ottoman frame scissor element comprises:
a first scissor element with a first top end and a first bottom end; and
a second scissor element with a second top end and a second bottom end;
wherein the first scissor element is pivotally connected at a first point between the first top end and the first bottom end to the second scissor element at a second point between the second top end and the second bottom end,
wherein the first top end is pivotally connected beneath a first side end of the ottoman cushion,
wherein the first bottom end is pivotally and slidably connected to a second side end of a structural element disposed beneath the ottoman cushion,
wherein the second top end is pivotally and slidably connected beneath a second side end of the ottoman cushion, and
wherein the second bottom end is pivotally connected to a first side end of the structural element.

15. The seating arrangement of claim 8, further comprising:
at least two vertical supports extending upwardly adjacent to the seat and to the ottoman, the two vertical supports being pivotally connected to the top bunk to permit the top bunk to pivot between the first and second configurations.

16. The seating arrangement of claim 8, wherein the seat, the top bunk, and the ottoman are attachable to tracks in a floor supporting the seat, the top bunk, and the ottoman.

17. The seating arrangement of claim 1, wherein the seat further comprises:
a seat frame supporting the seat, the seat frame including a seat frame scissor element permitting the seating surface to transition between the first predetermined height and the second predetermined height.

18. The seating arrangement of claim 17, wherein the seat frame scissor element comprises:
a first scissor element with a first top end and a first bottom end; and
a second scissor element with a second top end and a second bottom end;
wherein the first scissor element is pivotally connected at a first point between the first top end and the first bottom end to the second scissor element at a second point between the second top end and the second bottom end,
wherein the first top end is pivotally and slidably connected beneath a forward end of the seat cushion,
wherein the first bottom end is pivotally connected to a rear end of a structural element disposed beneath the seat cushion,
wherein the second top end is pivotally connected beneath a rear end of the seat cushion, and
wherein the second bottom end is pivotally and slidably connected to a forward end of the structural element.

19. The seating arrangement of claim 1, further comprising:
an upper side cushion disposed adjacent a top edge of the top bunk when in the first configuration,
wherein the upper side cushion forms a portion of the top bunk bed when in the second configuration.

20. The seating arrangement of claim 1, further comprising:
a lower side cushion disposed adjacent a bottom edge of the top bunk when in the first configuration,
wherein the lower side cushion forms a portion of a bottom bunk bed when in the second configuration.

21. The seating arrangement of claim 1, wherein the seating arrangement is adapted for an aircraft cabin.

22. The seating arrangement of claim 21, wherein, when positioned within the aircraft cabin, and when in the first configuration, the top bunk is stowed adjacent to a wall of the aircraft.

23. The seating arrangement of claim 21, further comprising:
a privacy compartment surrounding the seating arrangement when positioned within the aircraft cabin.

* * * * *